(12) United States Patent
Wang et al.

(10) Patent No.: US 10,878,298 B2
(45) Date of Patent: Dec. 29, 2020

(54) TAG-BASED FONT RECOGNITION BY UTILIZING AN IMPLICIT FONT CLASSIFICATION ATTENTION NEURAL NETWORK

(71) Applicant: Adobe Inc., San Jose, CA (US)

(72) Inventors: Zhaowen Wang, San Jose, CA (US); Tianlang Chen, Rochester, NY (US); Ning Xu, Urbana, IL (US); Hailin Jin, San Jose, CA (US)

(73) Assignee: ADOBE INC., San Jose, CA (US)

( * ) Notice: Subject to any disclaimer, the term of this patent is extended or adjusted under 35 U.S.C. 154(b) by 52 days.

(21) Appl. No.: 16/294,417

(22) Filed: Mar. 6, 2019

(65) Prior Publication Data

US 2020/0285916 A1 Sep. 10, 2020

(51) Int. Cl.

| | |
|---|---|
| *G06N 20/00* | (2019.01) |
| *G06K 9/68* | (2006.01) |
| *G06K 9/62* | (2006.01) |
| *G06K 9/46* | (2006.01) |
| *G06F 16/906* | (2019.01) |
| *G06N 3/08* | (2006.01) |

(Continued)

(52) U.S. Cl.
CPC ......... *G06K 9/6828* (2013.01); *G06F 16/906* (2019.01); *G06F 16/90335* (2019.01); *G06F 40/109* (2020.01); *G06K 9/46* (2013.01); *G06K 9/6255* (2013.01); *G06K 9/6257* (2013.01); *G06K 9/6262* (2013.01); *G06K 9/6277* (2013.01); *G06N 3/084* (2013.01)

(58) Field of Classification Search
CPC combination set(s) only.
See application file for complete search history.

(56) References Cited

U.S. PATENT DOCUMENTS 9,501,724 B1 * 11/2016 Yang .................. G06T 3/40
10,095,957 B2 * 10/2018 Kulkarni ............. G06K 9/4604
(Continued)

OTHER PUBLICATIONS

P. Anderson, X. He, C. Buehler, D. Teney, M. Johnson, S. Gould, and L. Zhang. Bottom-up and top-down attention for image captioning and vqa. arXiv preprint arXiv:1707.07998, 2017.

(Continued)

*Primary Examiner* — Cindy Trandai
(74) *Attorney, Agent, or Firm* — Keller Jolley Preece

(57) ABSTRACT

The present disclosure relates to a tag-based font recognition system that utilizes a multi-learning framework to develop and improve tag-based font recognition using deep learning neural networks. In particular, the tag-based font recognition system jointly trains a font tag recognition neural network with an implicit font classification attention model to generate font tag probability vectors that are enhanced by implicit font classification information. Indeed, the font recognition system weights the hidden layers of the font tag recognition neural network with implicit font information to improve the accuracy and predictability of the font tag recognition neural network, which results in improved retrieval of fonts in response to a font tag query. Accordingly, using the enhanced tag probability vectors, the tag-based font recognition system can accurately identify and recommend one or more fonts in response to a font tag query.

20 Claims, 12 Drawing Sheets

(51) Int. Cl.
*G06F 16/903* (2019.01)
*G06F 40/109* (2020.01)

(56) References Cited

U.S. PATENT DOCUMENTS

| | | | |
|---|---|---|---|
| 10,169,304 B1 | 1/2019 | Joshi et al. | |
| 10,262,236 B2* | 4/2019 | Lim | G06K 9/6256 |
| 2012/0093396 A1* | 4/2012 | Dai | G06K 9/6232 |
| | | | 382/159 |
| 2017/0098138 A1* | 4/2017 | Wang | G06K 9/6828 |
| 2017/0098140 A1* | 4/2017 | Wang | G06T 3/40 |
| 2017/0228870 A1 | 8/2017 | Chavez et al. | |
| 2018/0089151 A1 | 3/2018 | Wang et al. | |
| 2018/0137349 A1* | 5/2018 | Such | G06N 3/08 |
| 2018/0137350 A1* | 5/2018 | Such | G06N 3/0445 |
| 2018/0267956 A1* | 9/2018 | Chang | G06F 40/114 |
| 2018/0365536 A1 | 12/2018 | Wang et al. | |
| 2019/0080164 A1* | 3/2019 | Duke | G06K 9/00456 |
| 2019/0080205 A1* | 3/2019 | Kaufhold | G06K 9/6257 |
| 2019/0114743 A1* | 4/2019 | Lund | G06N 5/046 |
| 2019/0130232 A1* | 5/2019 | Kaasila | G06K 9/6271 |
| 2019/0236614 A1* | 8/2019 | Burgin | G06Q 30/0185 |
| 2019/0258854 A1* | 8/2019 | Hosabettu | G06K 9/66 |
| 2020/0012943 A1 | 1/2020 | Neves et al. | |
| 2020/0143191 A1* | 5/2020 | Du | G06K 9/4604 |
| 2020/0193299 A1* | 6/2020 | Geva | G06K 9/6215 |
| 2020/0219274 A1* | 7/2020 | Afridi | G06N 3/04 |

OTHER PUBLICATIONS

S. Azadi, M. Fisher, V. Kim, Z. Wang, E. Shechtman, and T. Darrell. Multi-content gan for few-shot font style transfer. In Proceedings of the IEEE Conference on Computer Vision and Pattern Recognition, vol. 11, p. 13, 2018.
G. Chen, J. Yang, H. Jin, J. Brandt, E. Shechtman, A. Agarwala, and T. X. Han. Large-scale visual font recognition. In Proceedings of the IEEE Conference on Computer Vision and Pattern Recognition, pp. 3598-3605, 2014.
J. H. Friedman. Greedy function approximation: a gradient boosting machine. Annals of statistics, pp. 1189-1232, 2001.
A. Frome, G. S. Corrado, J. Shlens, S. Bengio, J. Dean, T. Mikolov, et al. Devise: A deep visual-semantic embedding model. In Advances in neural information processing systems, pp. 2121-2129, 2013.
I. Goodfellow, J. Pouget-Abadie, M. Mirza, B. Xu, D. Warde-Farley, S. Ozair, A. Courville, and Y. Bengio. Generative adversarial nets. In Advances in neural information processing systems, pp. 2672-2680, 2014.
J. Gu, J. Cai, S. Joty, L. Niu, and G. Wang. Look, imagine and match: Improving textual-visual cross-modal retrieval with generative models. In Proceedings of the IEEE Conference on Computer Vision and Pattern Recognition, pp. 7181-7189, 2018.
P. Isola, J.-Y. Zhu, T. Zhou, and A. A. Efros. Image-to-image translation with conditional adversarial networks. arXiv preprint, 2017.
J.-H. Kim, S.-W. Lee, D. Kwak, M.-O. Heo, J. Kim, J.-W. Ha, and B.-T. Zhang. Multimodal residual learning for visual qa. In Advances in Neural Information Processing Systems, pp. 361-369, 2016.
C. H. Lampert, H. Nickisch, and S. Harmeling. Learning to detect unseen object classes by between-class attribute transfer. In Computer Vision and Pattern Recognition, 2009. CVPR 2009. IEEE Conference on, pp. 951-958. IEEE, 2009.
K.-H. Lee, X. Chen, G. Hua, H. Hu, and X. He. Stacked cross attention for image-text matching. arXiv preprint arXiv:1803.08024, 2018.
S. Li, T. Xiao, H. Li, W. Yang, and X. Wang. Identity-aware textual-visual matching with latent co-attention. In Computer Vision (ICCV), 2017 IEEE International Conference on, pp. 1908-1917. IEEE, 2017.
S. Li, T. Xiao, H. Li, B. Zhou, D. Yue, and X. Wang. Person search with natural language description. arXiv preprint arXiv:1702.05729, 2017.
J. Lu, C. Xiong, D. Parikh, and R. Socher. Knowing when to look: Adaptive attention via a visual sentinel for image captioning. In Proceedings of the IEEE Conference on Computer Vision and Pattern Recognition (CVPR), vol. 6, p. 2, 2017.
S. Ma, J. Fu, C. W. Chen, and T. Mei. Da-gan: Instance-level image translation by deep attention generative adversarial networks. In Proceedings of the IEEE Conference on Computer Vision and Pattern Recognition, pp. 5657-5666, 2018.
M. Mirza and S. Osindero. Conditional generative adversarial nets. arXiv preprint arXiv:1411.1784, 2014.
P. O'Donovan, J. Libeks, A. Agarwala, and A. Hertzmann. Exploratory font selection using crowdsourced attributes. ACM Transactions on Graphics (TOG), 33(4):92, 2014.
S. Reed, Z. Akata, H. Lee, and B. Schiele. Learning deep representations of fine-grained visual descriptions. In Proceedings of the IEEE Conference on Computer Vision and Pattern Recognition, pp. 49-58, 2016.
R. Socher, M. Ganjoo, C. D. Manning, and A. Ng. Zero-shot learning through cross-modal transfer. In Advances in neural information processing systems, pp. 935-943, 2013.
C. Wah, S. Branson, P. Welinder, P. Perona, and S. Belongie. The Caltech-UCSD Birds-200-2011 Dataset. Technical report, 2011.
B. Wang, Y. Yang, X. Xu, A. Hanjalic, and H. T. Shen. Adversarial cross-modal retrieval. In Proceedings of the 2017 ACM on Multimedia Conference, pp. 154-162. ACM, 2017.
Y. Wang, Z. Lian, Y. Tang, and J. Xiao. Font recognition in natural images via transfer learning. In International Conference on Multimedia Modeling, pp. 229-240. Springer, 2018.
Z. Wang, J. Yang, H. Jin, E. Shechtman, A. Agarwala, J. Brandt, and T. S. Huang. Deepfont: Identify your font from an image. In Proceedings of the 23rd ACM international conference on Multimedia, pp. 451-459. ACM, 2015.
Y. Xian, B. Schiele, and Z. Akata. Zero-shot learning the good, the bad and the ugly. arXiv preprint arXiv:1703.04394, 2017.
F. S. Y. Yang, L. Zhang, T. Xiang, P. H. Torr, and T. M. Hospedales. Learning to compare: Relation network for few-shot learning. 2018.
Z. Yang, X. He, J. Gao, L. Deng, and A. Smola. Stacked attention networks for image question answering. In Proceedings of the IEEE Conference on Computer Vision and Pattern Recognition, pp. 21-29, 2016.
Q. You, H. Jin, Z. Wang, C. Fang, and J. Luo. Image captioning with semantic attention. In Proceedings of the IEEE conference on computer vision and pattern recognition, pp. 4651-4659, 2016.
Q. You, J. Luo, H. Jin, and J. Yang. Cross-modality consistent regression for joint visual-textual sentiment analysis of social multimedia. In Proceedings of the Ninth ACM international conference on Web search and data mining, pp. 13-22. ACM, 2016.
L. Zhang, T. Xiang, S. Gong, et al. Learning a deep embedding model for zero-shot learning. 2017.
X. Zhang, H. Lai, and J. Feng. Attention-aware deep adversarial hashing for cross-modal retrieval. In European Conference on Computer Vision, pp. 614-629. Springer, 2018.
Y. Zhang, Y. Zhang, and W. Cai. Separating style and content for generalized style transfer. In Proceedings of the IEEE Conference on Computer Vision and Pattern Recognition, vol. 1, 2018.
Z. Zheng, L. Zheng, M. Garrett, Y. Yang, and Y.-D. Shen. Dual-path convolutional image-text embedding. arXiv preprint arXiv:1711.05535, 2017.
B. Zhou, A. Lapedriza, A. Khosla, A. Oliva, and A. Torralba. Places: A 10 million image database for scene recognition. IEEE transactions on pattern analysis and machine intelligence, 40(6):1452-1464, 2018.
J.-Y. Zhu, T. Park, P. Isola, and A. A. Efros. Unpaired image-to-image translation using cycle-consistent adversarial networks. arXiv preprint, 2017.
Y. Zhu, T. Tan, and Y. Wang. Font recognition based on global texture analysis. IEEE Transactions on pattern analysis and machine intelligence, 23(10):1192-1200, 2001.
A. Zramdini and R. Ingold. Optical font recognition using typographical features. IEEE Transactions on Pattern Analysis & Machine Intelligence, (8):877-882, 1998.

(56) References Cited

OTHER PUBLICATIONS

U.S. Appl. No. 16/369,893, Mar. 6, 2020, Preinterview 1st Office Action.
U.S. Appl. No. 16/369,893, dated Jul. 15, 2020, Notice of Allowance.

* cited by examiner

TAG-BASED FONT RECOGNITION BY UTILIZING AN IMPLICIT FONT CLASSIFICATION ATTENTION NEURAL NETWORK

BACKGROUND

Recent years have seen a proliferation in the use of computing devices in the area of digital typography with respect to creating and editing electronic documents. Indeed, it is now commonplace for individuals and businesses to use digital typography to create customized web pages, e-mails, magazines, marketing materials, and other electronic documents utilizing desktop and laptop computers, mobile devices, tablets, smartphones, or other computing devices.

Recent years have also seen an increase in the type and variety of digital fonts utilized in electronic documents. Individuals can find, access, and install digital fonts on a computing device for use in creating electronic documents from large repositories. For example, an electronic document can use digital fonts selected from a collection of thousands of digital fonts.

A significant challenge that has arisen with the increase in the number of digital fonts is the capability to efficiently find a desired font or font style. One type of font retrieval is tag-based font retrieval in which a user provides a query term to search for corresponding fonts. A number of problems have made developing a tag-based font search system challenging. For example, font tags are not standardized. To illustrate, the number of potential font tags is unlimited. As part of this issue, a font tag can describe different categories of a font, such as the font's visual appearance, characteristics, usage, classification, family, mood, special properties, and/or other attribute categories. Accordingly, the vastness of a font tag library creates difficulty in training a tag-based font search system. Indeed, a large number of font-tags can lead to misclassification and inaccurate results. Further, this problem is exacerbated as new fonts, with or without font tags, are constantly being created.

In addition, font tags are subjective to users creating them. The importance and informativeness of tags may vary from user to user. In addition, there is also a large gap between the semantics of natural language in a font tag and the visual appearance of the font. Further, the tag description from a user can sometimes be ambiguous and vague. Also, different users may choose vastly different tags when describing fonts of similar visual appearance in their minds. For example, different users can use the same tag to describe different looking fonts. Similarly, different users can use unrelated tags to describe the same font. Thus, relying on user tags alone leads to inconsistent and unreliable results.

Because of these issues, attempts at creating tag-based font search systems have been unsuccessful and resulted in unsatisfactory systems. For instance, these tag-based font search systems necessitate large amounts of memory and computational requirements. Furthermore, conventional tag-based font search systems are inaccurate due to training using user tags. Additionally, conventional tag-based font search systems typically have relatively small numbers of tags and fonts, meaning the system are limited and inflexible.

These and other problems exist with regard to retrieving digital fonts utilizing a tag-based font search system using existing systems and methods.

SUMMARY

Embodiments of the present disclosure provide benefits and/or solve one or more of the foregoing or other problems in the art with systems, computer media, and methods for effectively recognizing digital fonts (or simply "fonts") based on font tag queries. For example, the disclosed systems utilize deep learning neural networks to identify fonts in response to font tag queries. More particularly, the disclosed systems use a combination of a font tag recognition neural network and a font classification neural network to generate font tag probability vectors that indicate the probability that a given font is associated with various tags. Specifically, the disclosed systems weight deep features determined by the font tag recognition neural network with implicit font classification information from the font classification neural network to improve the accuracy of font tag probability vectors. Then given a font tag query, the disclosed systems use the font tag probability vectors to identify fonts associated with the font tag query.

To illustrate, the disclosed systems identify a set of font images that are labeled with font tags and font classifications. Using the font images and tags, the disclosed systems train a font tag recognition neural network to determine font tag probabilities that each font corresponds to each font tag. In addition, the disclosed systems train an implicit font classification attention model that transforms the output of a trained font classification neural network into a font classification attention map matching the dimensions of hidden features of the font tag recognition neural network. Further, the disclosed systems jointly train portions of the font tag recognition neural network with the implicit font classification attention model to generate enhanced font tag probabilities that each font corresponds to each font tag. Using the generated enhanced font tag probabilities, the disclosed systems can accurately retrieve and recommend fonts in response to a font tag query.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
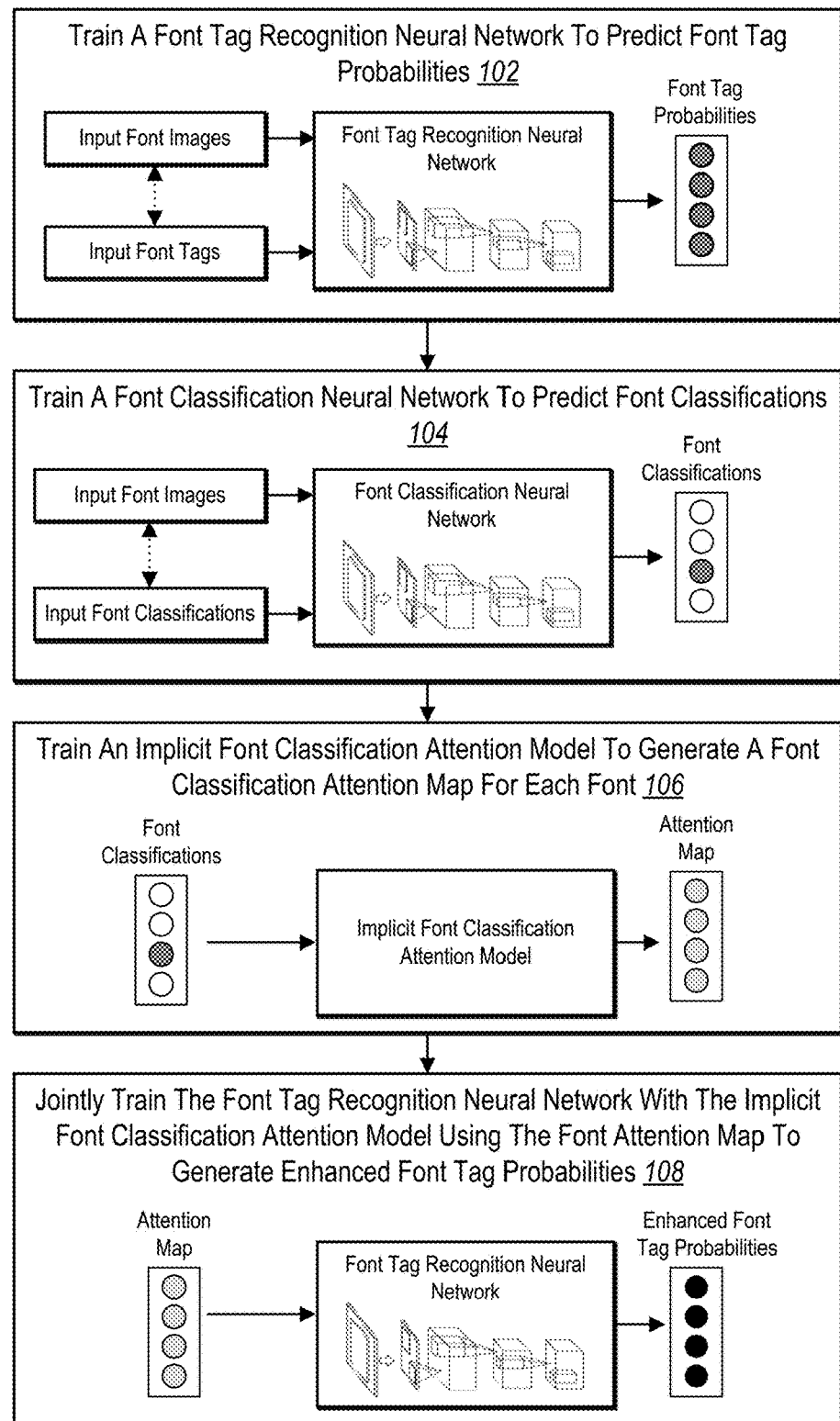
FIG. 1 illustrates a diagram of a general process for training a font tag recognition neural network and an implicit font classification attention model in accordance with one or more embodiments.

This disclosure describes one or more embodiments of a tag-based font recognition system that utilizes a multi-learning framework to develop and improve tag-based font recognition using deep learning neural networks. In particular, the tag-based font recognition system jointly trains a font tag recognition neural network with a font classification attention model to generate font tag probability vectors that are enhanced by implicit font classification information. Further, using the enhanced tag probability vectors, the tag-based font recognition system can identify one or more fonts to recommend in response to a font tag query.

To illustrate, in one or more embodiments, the tag-based font recognition system (or simply "font recognition system") trains a font tag recognition neural network to determine initial font tag probabilities that indicate the likelihood that each font in a set of fonts corresponds to each font tag in a set of font tags. In addition, the font recognition system trains a font classification attention model to generate a font classification attention map that transforms font classification feature vectors outputted from a separately trained font classification neural network to match the dimensions of feature vectors outputted from the trained font tag recognition neural network. Further, the font recognition system jointly trains the font tag recognition neural network with the implicit font classification attention model using the font classification attention map and the font classification feature vectors to determine an enhanced tag probability for each font in the set of fonts.

In various embodiments, the font recognition system utilizes the enhanced tag probabilities to retrieve fonts from the set of fonts in response to a font tag query. More particularly, the font recognition system receives a font tag query that includes a font tag (or multiple tags). Utilizing the font tag, the font recognition system determines the tag probabilities between the font tag and each of the fonts in the set of fonts from the enhanced tag probabilities. Further, the tag-based font recognition system can then return one or more fonts having the highest (e.g., most favorable) probabilities in response to the font tag query.

As mentioned above, the font recognition system trains multiple deep learning neural networks. In one or more embodiments, the font recognition system initially trains the font classification neural network. For example, the font recognition system generates a first convolutional neural network (CNN) and trains it based on font images and corresponding font tags to determine an initial font tag probability of each font of a set of fonts.

In various embodiments, the font recognition system also trains a font classification neural network. For example, the font recognition system generates a second CNN and trains it to predict font classifications given an unclassified input font image. Also, the font recognition system can train the font classification neural network based on the same font images but with corresponding font classification labels as ground truths rather than font tags. Alternatively, the font recognition system utilizes a pre-trained font classification neural network.

Utilizing the trained font classification neural network, in one or more embodiments, the font recognition system generates and trains an implicit font classification attention model. In some embodiments, the implicit font classification attention model is added to the trained font classification neural network and further trained to generate a font classification attention map. As mentioned above, the font classification attention map transforms the font classification feature vectors from the font classification neural network to align with feature vectors of the font tag recognition neural network.

More particularly, in various embodiments, the font tag recognition neural network generates font tag recognition feature vectors having n-dimensions that correspond to the number of font tags used in training. Similarly, the font classification neural network generates font classification feature vectors having m-dimensions that correspond to the number of font classifications used in training. Thus, the implicit font classification attention model generates a font classification attention map for each font that converts the m-dimensions of the font classification feature vectors into an n-dimension mapping for each font (i.e., a font classification attention map). Using the font classification attention maps, the font recognition system can inject font classification information from the font classification neural network into the font tag recognition neural network. Indeed, the font recognition system can weight (e.g., using element-wise multiplication) hidden layers of the font tag recognition neural network with implicit deep font classification information to improve font tag predictions.

As mentioned above, the font recognition system can jointly train the font tag recognition neural network and the implicit font classification attention model. In one or more embodiments, the font recognition system jointly trains the higher fully-connected neural network layers of the font tag recognition neural network with the implicit font classification attention model utilizing font tag recognition feature vectors weighted by corresponding font classification attention maps. For example, the font recognition system measures and back propagates error loss to the higher fully-connected neural network layers of the font tag recognition neural network with the implicit font classification attention model while not tuning the pre-trained lower neural network layers of the font tag recognition neural network or tuning the remaining layers of the pre-trained font classification neural network.

In some embodiments, the font recognition system can increase the robustness of the font classification attention map before injecting the font classification attention map into the hidden layers of the font tag recognition neural network. For example, upon receiving an image of a font at the implicit font classification attention model, the font recognition system creates additional images of the font that include different characters of the font chosen at random. The font recognition system then feeds the additional images into the implicit font classification attention model to obtain different font classification attention values for the font, which are averaged together to form a more robust font classification attention map for the font.

As previously mentioned, the font recognition system provides numerous advantages and benefits over conventional systems and methods. As an example, the font recognition system utilizes deep learning neural networks to learn, predict, and retrieve fonts based on font tag queries. Indeed, the font recognition system generates and jointly trains multiple neural networks and models to improve the accuracy of tag-based font retrieval.

As another example, in many embodiments, the font recognition system can efficiently analyze heterogeneous (e.g., non-standardized, subjective, vague, and/or ambiguous) font tags and generate uniform font-tag prediction representations. Indeed, the font recognition system learns objective, well-defined, and precise metrics between font tags and font classifications (e.g., visual features) for fonts through injecting implicit font classification information into the font tag recognition neural network. In this manner, as new fonts are created, the font recognition system can accurately and efficiently learn correspondences between fonts and any number of font tags.

Because the user embeddings system efficiently processes non-standardized font tags, the font recognition system provides increased flexibility over conventional systems. Indeed, the ability of the font recognition system to efficiently treat non-standardized font tags enables the font recognition system to operate given the many different font tag categories (e.g., the font's visual appearance, characteristics, usage, classification, family, mood, special properties, and/or other attribute categories).

The font recognition system also improves computer efficiency. Indeed, by more accurately and precisely identifying relationships between fonts, font tags, and font classifications, the font recognition system can reduce computing resources required to generate, predict, and retrieve fonts, especially in response to font tag queries. Additionally, as described below in connection with FIG. 7, researchers compared embodiments of the font recognition system to baseline font tag recognition neural networks and found that the font recognition system outperformed these baseline neural networks.

Moreover, the font recognition system improves efficiency and maximizes the processing capabilities of current mobile client devices, enabling mobile client devices to achieve results not previously possible. Indeed, in some embodiments, the font recognition system can generate a font/font tag correlation database that is compact in size and can be easily downloaded, stored, and executed on client devices. Accordingly, the font recognition system enables mobile client devices to locally, easily, and quickly identify fonts based on font tags from font tag queries.

Additional advantages and benefits of the font recognition system will become apparent in view of the following description. Further, as illustrated by the foregoing discussion, the present disclosure utilizes a variety of terms to describe features and advantages of the font recognition system. For example, as used herein, the term "digital font" (or simply "font") refers to a defined set of digital characters (e.g., glyphs). In particular, the term "font" includes a collection of digital characters of a particular style or typeface. A font includes digital files with the extensions, such as, but not limited to: .ttf, .otf, .fnt, .abf, .ttc, .suit, .woff, .vnf, .t65, .sfp, .sad, .pmt, .pfm, .pfb, .pfa, .odtff, .mf, .gdr, .fon, .fnt, .font, .etx, .eot, .compositefont, .acfm, .afm, or .amfm. For example, the term digital font includes fonts entitled Times New Roman, Helvetica, Arial, PT Sans Regular, Corbel, or other font titles.

As used herein, the term "font image" refers to any type of electronic document, image, or file that includes written text (i.e., glyph content) in a font. For example, a font image can include an electronic document in the form of an image file (permanent or temporary), a clipboard file, a word-processing document, a portable document file (PDF), an e-mail file, a text file, a web page, or any other electronic file. The font recognition system can utilize font images to train one or more neural network (e.g., font training images). In addition, a font image can be associated with metadata, such as fonts (e.g., font names), font tags, and/or font classifications that provide information about the font used in the font image.

The term "font tag," as used herein, refers to a label that describes a characteristic or attribute associated with the font. In particular, the term "font tag" can describe the look, style, or feel of a font. In some embodiments, font tags are divided into categories, such as visual appearance, characteristics (e.g. thin, block, modern, antique, crazy), usage or utility (e.g. headline, poster, magazine, logo), family, mood, special properties, and/or other attribute categories (e.g., ornamental, kid, ancient). Additionally, a font tag can also indicate attributes corresponding to a font, such as style (e.g., regular, bold, italic, shadowed, underlined, strikethrough, hand-written, display, subscript, or superscript), weights (e.g., light, regular, and heavy weights), widths (e.g., condensed, regular, and extended widths), capitalization styles (e.g., all caps, small caps, title case, and sentence case), x-heights (e.g., small, regular and large x-heights), and contrasts (e.g., low, regular, and high contrasts).

Similarly, the term "font classification" refers to a font family, category, and/or font name and can include predefined categories utilized to classify digital fonts. For instance, font classifications include font classes (i.e., Serif, Sans Serif, Slab Serif, Script, Blackletter, Mono, Hand, or Decorative). In some embodiments, a font tag and a font classification include overlapping labels or information. For example, a category of font tags can include font classifications.

As mentioned above, the font recognition system utilizes machine learning and various neural networks in various embodiments. Indeed, the font recognition system trains various neural networks to generate font feature vectors including font tag recognition feature vectors and font classification feature vectors. The term "machine learning," as used herein, refers to the process of constructing and implementing algorithms that can learn from and make predictions on data. In general, machine learning may operate by building models from example inputs, such as a training set of font images corresponding to a plurality of fonts, to make data-driven predictions or decisions. Machine learning can include neural networks and/or machine-learning models (e.g., the font tag recognition neural network, the font classification neural network with or without the implicit font classification attention model, a generative adversarial network ("GAN") having a generator neural network and a discriminator neural network, and a retrieval model).

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using supervisory data to tune parameters of the neural network.

In addition, in one or more embodiments, the term neural network can include deep convolutional neural networks (i.e., "CNNs"), or other types of deep neural networks. The description and figures below generally refer to a CNN, which includes lower layers (e.g., convolutional, deconvolutional, and pooling layers), and higher layers (e.g., fully-connected layers and classifiers). Example architecture of a CNN is provided in FIG. 2C.

As used herein, the term "loss function" or "loss model" refers to a function that indicates error loss between feature vectors and/or probability vectors in multi-dimensional vector space. A machine-learning algorithm (e.g., neural network) can repetitively train to minimize and/or maximize font classification error loss (e.g., font classification error loss or tag-based font error loss) based on ground truths (e.g., font classifications or font tags). Indeed, the loss function provides feedback, which is back propagated, to one or more layers of a neural network to tune/fine-tune those layers. Examples of loss functions include a sigmoid unit function, a softmax classifier with cross-entropy loss, a residual loss function, a perceptual loss function, a total variance loss function, a texture loss function, a hinge loss function, and a least squares loss function.

As used herein, joint training (or joint learning) refers to tuning parameters of multiple learning models together. In particular, joint training (or learning) includes solving a plurality of learning tasks at the same time while utilizing the roles and constraints across the tasks. For example, the font recognition system can employ joint learning to iteratively or simultaneously train and tune weights and parameters of the various neural networks and/or machine-learning models. In some embodiments, joint training includes alternating training back and forth between the font tag recognition neural network and the implicit font classification attention model and/or changing the learning rates, as described further below.

As mentioned above, the font recognition system generates font feature vectors such as a font classification feature vector and a font tag recognition feature vector. As used herein, the term "font feature vector" (or simply "feature vector") refers to a vector of numeric values representing characteristics and/or attributes of a font. In particular, the term "font feature vector" includes a set of values corresponding to latent and/or patent attributes and characteristics of a font. In one or more embodiments, a feature vector is a multi-dimensional dataset that represents a font.

In one or more embodiments, a feature vector includes a set of numeric metrics learned by a machine-learning algorithm such as a neural network. For example, a font classification feature vector can include font glyph data, such as glyph curvature, glyph spacing, glyph size, glyph shape, glyph width, glyph height, glyph location (e.g., glyph location in relation to a baseline), glyph area, glyph orientation, number of curves per glyph, arc length, glyph contrast, and font classification features (e.g., font features utilized to classify a font) in addition to hidden or latent features. In addition, a font classification feature vector can provide numeric values for the font class of a font. Further, the font classification feature vector can be m-dimensions based on the number of font classifications corresponding to a font training image set.

Similarly, a font tag recognition feature vector can include font information indicating characteristics or attributes associated with the font as indicated by corresponding font tags. Indeed, a font tag recognition feature vector can provide numeric values for the font tags associated with a font. In addition, the font tag recognition feature vector can be n-dimensions based on the number of font tags corresponding to a font training image set.

In addition, the font recognition system utilizes the font tag recognition neural network to generate tag-based font probability vectors. The term "tag-based font probability vector" refers to a set of values that provide a correlation between font tags and known fonts. In particular, the term "tag-based font probability vector" includes an n-dimensional vector where n corresponds to a number of known fonts. For each of the n known fonts, the font probability vector includes a corresponding probability that the text font tag query font matches the known font. In some cases, a font tag recognition neural network generates a tag-based font probability vector as described below.

The term "attention map" as used herein refers to a mapping that connects feature vectors from a first neural network (e.g., the font classification neural network) to a second neural network (e.g., the font tag recognition neural network). In particular, the term "font classification attention map" refers to a font classification feature vector that has been transformed from m-dimensions to n-dimensions. In various embodiments, an implicit font classification attention model (or an implicit font classification attention neural network) receives a font classification feature vector for a font and converts the dimensions of the vector to match the dimensions used by the font tag recognition neural network. In this manner, a font classification attention map enables the font recognition system to mix and weight feature vectors from the font classification neural network with feature vectors of the font tag recognition neural network. Accordingly, the font recognition system can implicitly influence the font tag recognition neural network based on font classification information learned by the font classification neural network for each font.

Referring now to the figures, FIG. 1 illustrates the general process for training a font tag recognition neural network and an implicit font classification attention model in accordance with one or more embodiments. In particular, FIG. 1 illustrates a series of acts 100. In various embodiments, the font recognition system implements the series of acts 100. The font recognition system can be implemented by one or more computing devices, such as one or more server devices, one or more client devices, or a combination of server devices and client devices.

As shown in FIG. 1, the font recognition system trains 102 a font tag recognition neural network to predict font tag probabilities. In various embodiments, the font recognition system utilizes a font training set that includes font images (e.g., input font images), font labels (e.g., font tags and font classifications). For example, the font recognition system utilizes the font tags as a ground-truth to tune the font tag recognition neural network to learn which font images correspond to which font tags. Indeed, the font tag recognition neural network generates font tag probabilities for each input font image that indicates the probability that each font tag correlates to the font displayed in the input font image. Additional detail regarding initially training the font tag recognition neural network is provided below with respect to FIG. 2A.

FIG. 1 also illustrates the font recognition system training 104 a font classification neural network to predict font classifications. In one or more embodiments, the font recognition system utilizes the same font training set mentioned above to train the font classification neural network. For instance, the font recognition system utilizes the font classification labels as a ground-truth to tune the font classification neural network to learn which font images (e.g., input font images) correspond to which font classifications. Indeed, the font recognition system learns to predict a font classification for each input font image. Additional detail regarding training the font classification neural network is provided below with respect to FIG. 2A.

As shown, the font recognition system trains 106 an implicit font classification attention model to generate a font classification attention map for each font. In some embodiments, the implicit font classification attention model is added to the trained font classification neural network. For example, the font recognition system inputs the predicted font classifications (e.g., font classification coefficients) into the implicit font classification attention model and trains the model to generate a font classification attention map. As mentioned above, a font classification attention map converts or maps the predicted font classifications to match the dimensions of the feature vectors produced by the font tag recognition neural network. In this manner, the font recognition system can incorporate the implicit font information from the font classification neural network to the font tag recognition neural network. Additional detail regarding training the implicit font classification attention model is provided below with respect to FIG. 2B.

To better incorporate the font classification attention map for a font to the font tag recognition neural network, the font recognition system jointly trains 108 the font tag recognition neural network with the implicit font classification attention model using the font classification attention map to generate enhanced font tag probabilities. More particularly, the font recognition system utilizes joint training to fine-tune the font tag recognition neural network and the implicit font classification attention model to more accurately learn how to incorporate the implicit font information from the font classification neural network into font tag probability predictions. This additional training enables the font recognition system to generate enhanced font tag probabilities that are more accurate and relevant than the initial font tag probabilities obtained from the initially trained font tag recognition neural network. Additional detail regarding joint training is provided below with respect to FIG. 2B.

In various embodiments, the font recognition system can also retrieve one or more fonts in response to a font tag query. For example, the font recognition system obtains a text query that includes one or more font tags. Using the enhanced font tag probabilities, the font recognition system determines fonts in the set of fonts that best correlate to the inputted font tags. The font recognition system can then recommend the one or more retrieved fonts in response to the query. Additional detail regarding retrieving fonts based on font tags is provided below with respect to FIG. 4.

Figure 2A:
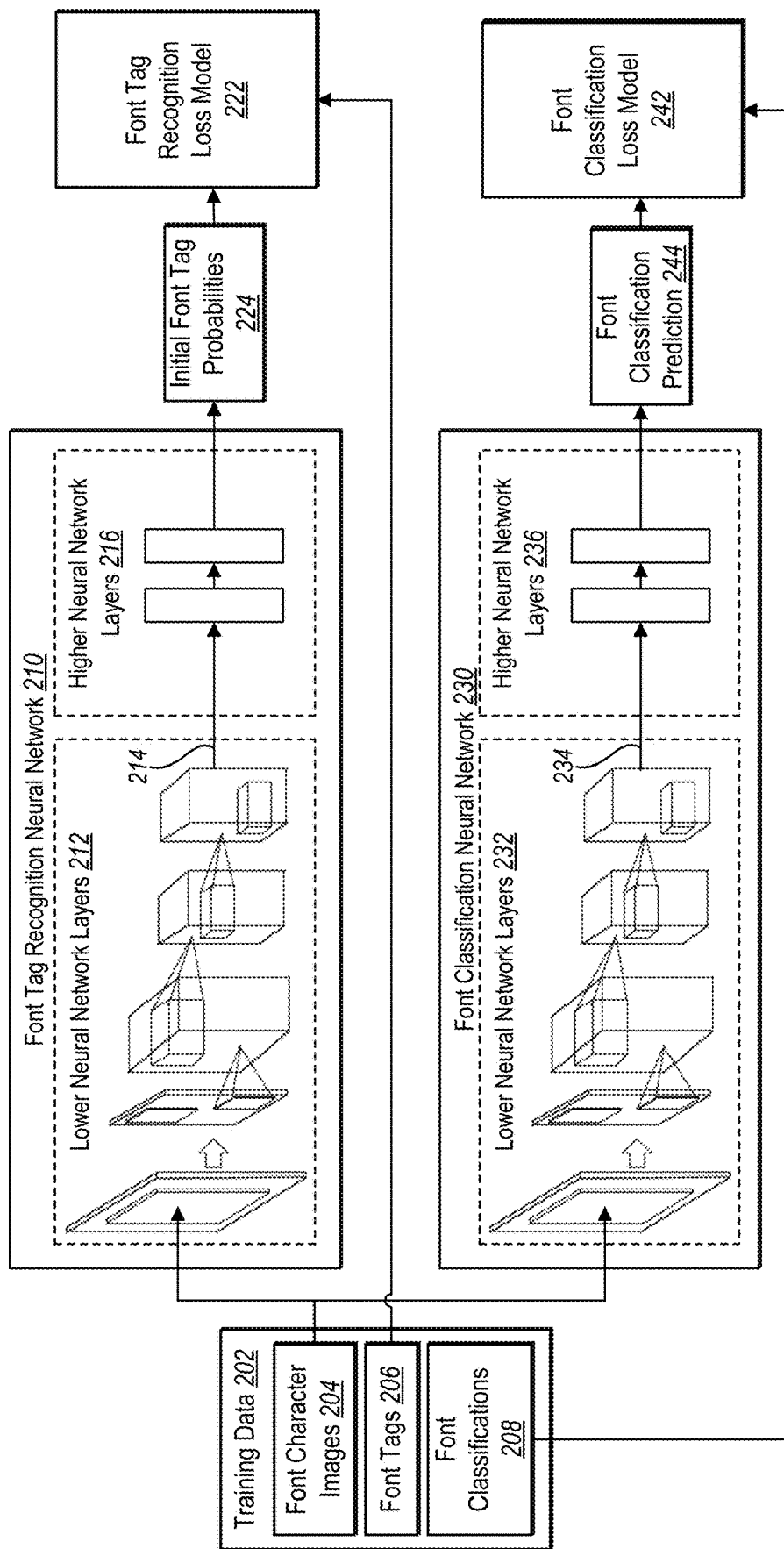
FIGS. 2A-2C illustrate diagrams of training a font tag recognition neural network and a font classification neural network having a font classification attention model in accordance with one or more embodiments.
Figure 2B:
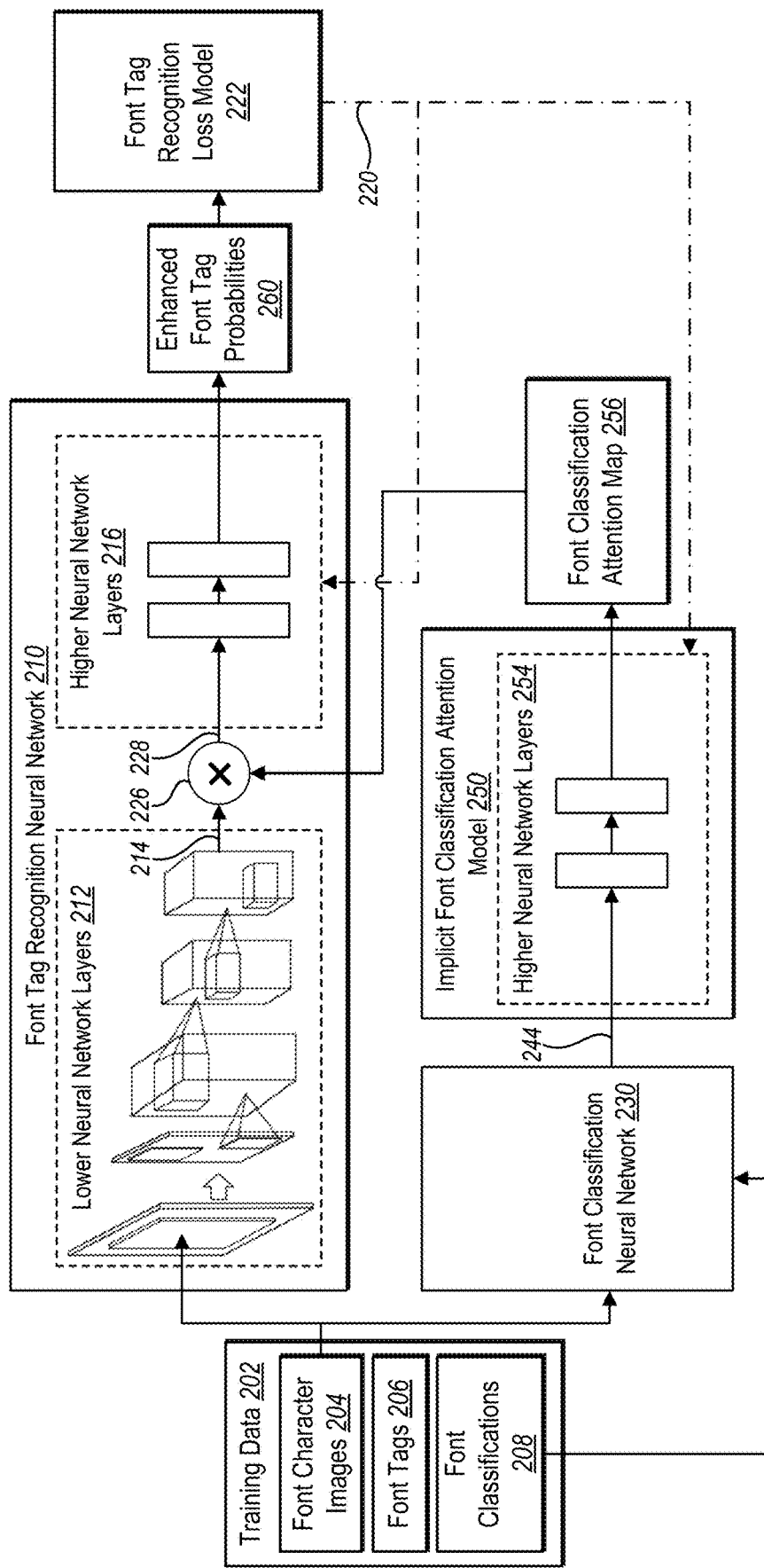
Figure 2C:
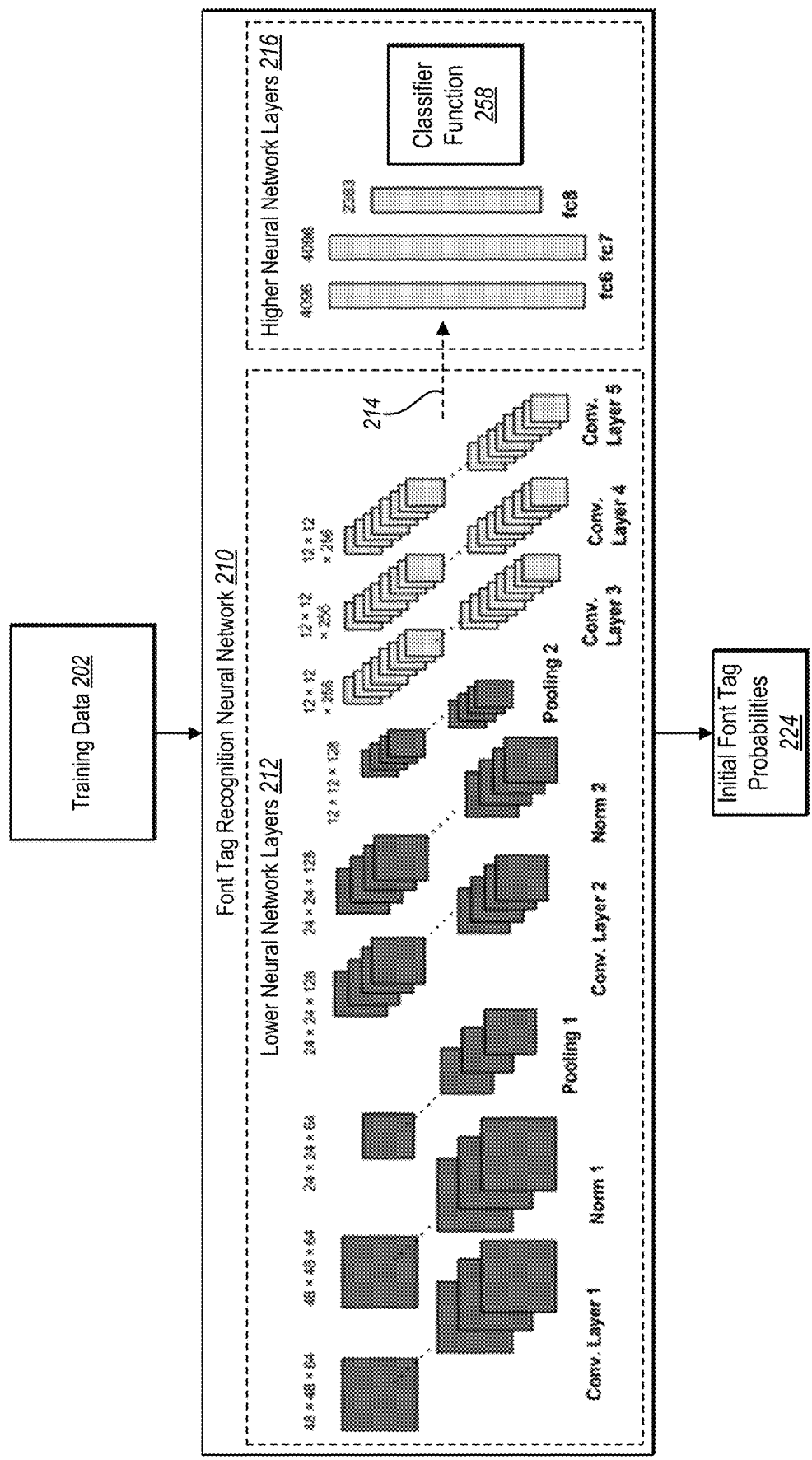

As mentioned above, FIGS. 2A-2C illustrate diagrams of a more detailed process for training the various font neural networks and models. In particular, FIG. 2A shows initially training separate font neural networks (e.g., a font tag recognition neural network 210 and a font classification neural network 230) using overlapping training data 202. FIG. 2B adds the implicit font classification attention model to the font classification neural network and describes jointly training the font tag recognition neural network with the implicit font classification attention model. FIG. 2C illustrates an example architecture of the font tag recognition neural network 210, which in many embodiments, is similar to the architecture of the font tag recognition neural network.

As mentioned above, FIG. 2A includes training data 202. As shown, the training data 202 includes font character images 204 of fonts as well as font tags 206 and font classifications 208 (i.e., font classification labels) that correlate to the fonts. In various embodiments, the font recognition system utilizes portions of the training data 202 to train the font tag recognition neural network 210 and the font classification neural network 230. For example, in some embodiments, the font recognition system utilizes the font character images 204 and corresponding font tags 206 from the training data 202 to initially train the font tag recognition neural network 210. In some embodiments, the font recognition system utilizes the font character images 204 and corresponding font classifications 208 to train the font classification neural network 230.

In various embodiments, the font recognition system pre-processes the training data 202 to ensure conformity across the data. In particular, the font recognition system pre-processes font names, tags, and classifications. To illustrate, in one or more embodiments, for each font tag, the font recognition system changes all characters in a tag to lowercase, lemmatizes each word (e.g., removes plurals) in a tag, connects multi-word tags with hyphens (e.g., "sans serif" to "sans-serif"), and/or combines duplicate tags. In additional embodiments, the font recognition system can also filter out tags, such as any tag that appears less than ten times in the training data 202.

Before describing how the font recognition system trains each of the font neural networks, additional detail is provided regarding generating or obtaining the training data 202. In various embodiments, the font recognition system obtains a set of fonts from one or more sources. For example, the font recognition system obtains fonts from one or more font repositories. As part of obtaining fonts, the font recognition system can also obtain font tags and font classifications corresponding to the fonts. In some instances, the font tags and/or classifications are provided by user input, such as by the creator of the font or by a font curator. In other instances, the tags and/or classifications are automatically generated.

Upon obtaining the set of fonts, the font recognition system can generate the training data 202. To illustrate, in one or more embodiments, the font recognition system generates a font character image by selecting a font, renders a number (e.g., five) of random characters (e.g., glyphs including upper and/or lowercase) written in the selected font, and captures/renders an image of the font characters. In addition, the font recognition system can associate one or more font tags and a font classification with the font character image.

In various embodiments, the font recognition system can generate a number of sets of font character images 204 along with corresponding font tags 206 and font classifications 208 for each font in the font set. For instance, the font recognition system renders millions of font character images 204 paired with font tags 206 and font classifications 208. In additional embodiments, the font recognition system allocates portions of the generated training data for testing (e.g., 10%) and validation (e.g., 10%) in addition to the training portion (e.g., 80%).

In additional embodiments, or in the alternative, the font recognition system can obtain the training data 202 from a third-party source. For example, the font recognition system previously created a training font set of text images, which is stored in a font database, either locally or remotely. In another example, the font recognition system obtains a training font set from a third-party, such as an online font library or repository. In addition, the font recognition system can combine one or more training font sets with newly rendered text images.

In various embodiments, the font recognition system randomly introduces deviations into the font character images 204. For example, the font recognition system randomly introduces noise (e.g., a small Gaussian noise with zero mean and a standard deviation of three), blur (e.g., a random Gaussian blur with standard deviation between two and four), perspective rotation (e.g., a randomly-parameterized affine transformation), and/or shading (e.g., random gradients that fill the input background) into some of the font character images 204. In addition, the font recognition system can add variable character spacing and/or variable aspect ratio modifications to the font character images 204. These deviations add robustness while training each font neural network as well as enable a trained font tag recognition neural network recognition neural network to better recognize and characters real-world font character images that are later added to be associated with font tags (e.g., offline training).

Turning now to training the font tag recognition neural network 210, in various embodiments, the font tag recognition neural network 210 is a convolutional neural network (CNN). In some embodiments, the font tag recognition neural network is a deep learning convolutional neural network. In alternative embodiments, the font tag recognition neural network 210 is a different type of neural network.

As shown, the font tag recognition neural network includes lower neural network layers 212 and higher neural network layers 216. In general, the lower neural network layers 212 are collectively called an encoder and the higher neural network layers 216 are collectively called a decoder or classifier (e.g., a font tag classifier). In one or more embodiments, the lower neural network layers 212 are convolutional layers that encode font character images 204 into hidden encoded features represented as font tag recognition feature vectors 214 (or simply "tag feature vectors 214").

As just mentioned, the lower neural network layers 212 generate tag feature vectors 214. In various embodiments, the tag feature vectors 214 are n-dimensional vectors represented in n-dimensional space (i.e., vector space), where n corresponds to the number of font tags included in the collection of font tags 206 from the training data 202. For example, if the training data 202 included 2,000 font tags, the tag feature vectors 214 would be a 2,000-dimensional vector. Each dimensional in a tag feature vector provides hidden or latent representations between the font in the font character image and the font tags within a font tag feature/vector space.

The higher neural network layers 216 can comprise fully-connected layers that classify the tag feature vectors 214 and output initial font tag probabilities 224 (e.g., a font tag probability vector). In some embodiments, the higher neural network layers 216 include a sigmoid function that classifies the probability (e.g., from [0-1]) that each font tag corresponds to a font character image being used to train the font tag recognition neural network 210, as indicated in an outputted initial font tag probability of a font tag probability vector. Indeed, the font recognition system utilizes the sigmoid function to classify the font tag probabilities 224 as the font tag recognition neural network 210 is designed as a multi-label learning task network to enable multiple tags to be assigned to each font. Overall, the font tag recognition neural network 210 extracts deep font visual features (e.g., line types, thickness, smoothness, curvature, height, width) and predicts font tag probabilities based on these visual features.

The font recognition system can also employ a loss layers model to train the font tag recognition neural network 210. As shown, a font tag recognition loss model 222 that receives font tags 206 corresponding to font character images 204 being fed to the lower neural network layers 212. Training the font tag recognition neural network 210 is now described below.

In one or more embodiments, the font recognition system initially trains the font tag recognition neural network 210 by tuning parameters based on the font character images 204 and the font tags 206, which are used to generate font tag probabilities. In addition, the font recognition system utilizes the font tag recognition loss model 222 to provide feedback based on the accuracy of the font classifications, which enables the font recognition system to update the tunable parameters. More specifically, the font recognition system uses error loss feedback to tune font feature extractions in the lower neural network layers 212 and higher neural network layers 216 to recognize font tags from input training images.

To demonstrate, the font recognition system trains the lower neural network layers 212 by tuning font feature extraction parameters, which are used to generate a tag feature vector 214 for each inputted font character image from the training data 202. The font recognition system then provides the generated tag feature vector 214 to the higher neural network layers 216, which compares the generated tag feature vector 214 to known tag feature vectors learned via training. The higher neural network layers 216 then utilize font tag recognition parameters to generate an initial font tag probability vector (e.g., initial font tag probabilities), which indicates a correspondence between the input font character image and each font tag.

As mentioned above, during training, the font recognition system provides the initial font tag probability vector to the font tag recognition loss model 222. As shown, the font tag recognition loss model 222 receives font tags 206 from the training data 202, which is utilized as a ground-truth to evaluate the initial font tag probability vector. In particular, the font tag recognition loss model 222 compares the initial font tag probabilities to the one or more font tags 206 to determine an amount of font tag recognition error loss (or simply "tag error loss"). In various embodiments, the font tag recognition loss model 222 employs cross-entropy loss, and/or mean square error computations, or another type of loss formulation to determine the amount of tag error loss.

Also, the font recognition system can utilize the tag error loss to train and optimize the neural network layers of the font tag recognition neural network 210 via back propagation and end-to-end learning. Indeed, in various embodiments, the font recognition system back propagates the tag error loss to tune tag recognition feature parameters within layers of the font tag recognition neural network 210. For instance, in one or more embodiments, the font recognition system takes the tag error loss output from the font tag recognition loss model 222 and provides it back to the lower neural network layers 212 and/or the higher neural network layers 216 until the tag error loss from the font tag recognition loss model 222 is minimized. In particular, the font tag recognition loss model 222 provides feedback 220 to the lower neural network layers 212 to further tune the font feature extraction parameters and/or the higher neural network layers 216 to further tune the font tag recognition parameters. As the tag error loss reduces, the accuracy of the initial font tag probabilities 224 improves.

Equation 1, shown below, provides an example formulation of training the font tag recognition neural network 210 with cross-entropy loss. By way of context for Equation 1, given the training font set $\{F_1, \ldots, F_M\}$ and character set $\{C_1, \ldots, C_{52}\}$ for an input glyph image $I_i^j$ that includes character $L_j$ of font $F_i$, the font tag recognition neural network 210 first extracts a hidden feature $f_i^j$ by a CNN. The hidden feature is then fed into a fully-connected layer with N output nodes, where N represents the total tag vocabulary size. Next, a sigmoid unit maps the value of each node in the range of [0-1], which represents the image's probability to match each specific tag. The font recognition system then utilizes cross-entropy loss to train the font tag recognition neural network 210 as follows:

$$L = \sum_{i,j} \sum_{k=1}^{N} \left( y_i^k \log(p_i^{j,k}) + (1 - y_i^k) \log(1 - p_i^{j,k}) \right) \quad (1)$$

As shown in Equation 1, $p_i^{j,k}$ represents the predicted probability for $I_i^j$ to match the kth tags. Also, in Equation 1 above, 1 if $F_i$ is labeled at the kth tag, otherwise $y_i^k$ is 0.

Turning now to the font classification neural network 230, the architecture of the font classification neural network 230 shares many similarities with the font tag recognition neural network 210. For example, the font classification neural network 230 is also a CNN having lower neural network layers 232 (e.g., convolutional encoder layers) and higher neural network layers 236 (e.g., a decoder or classifier). However, while the font recognition system trains the font tag recognition neural network 210 to predict the probability that a given input font (e.g., shown the font character image) corresponds to each of the font tags, the font recognition system trains the font classification neural network 230 to classify (e.g., identify or predict) the input font shown the font character image. Indeed, the font classification neural network 230 is designed as a single-label learning task network as each font corresponds to a single font classification (e.g., each font only has one font name).

To achieve the different objectives of the font classification neural network 230, the font recognition system employs a few different components and training methods between the two neural networks. To illustrate, in training the font classification neural network 230, in one or more embodiments, the font recognition system utilizes the font character images 204 and corresponding font classifications 208 from the training data 202. As shown, the font recognition system feeds the font character images 204 into the lower neural network layers 232 of the font classification neural network 230. The lower neural network layers 232 can utilize font feature extraction parameters to encode font classification feature vectors 234.

In various embodiments, the font classification feature vectors 234 are m-dimensional vectors represented in m-dimensional font classification vector space, where m corresponds to the number of font classifications in the training data 202. For example, if the training data 202 includes 15,000 fonts, the font classification feature vectors 234 would be a 15,000-dimensional vector. Each dimension in a font classification feature vector provides hidden or latent representations between the font in the font character image and the font classifications within the font classification vector space.

The higher neural network layers 236 of the font classification neural network 230 receive the font classification feature vectors 234 and generate a font classification prediction 244. More particularly, in various embodiments, the higher neural network layers 236 include a softmax classifier that predicts which font classification best corresponds to each given input font (e.g., a font character image). Indeed, the softmax classifier outputs a font classification prediction 244 (e.g., a font classification prediction vector) that is m-dimensional and all the entries in the vector sum to one (e.g., to accommodate the single-label learning task). The font recognition system selects the entry in the font classification prediction vector with the highest prediction probability as the predicted font for the given input font. In some embodiments, the font recognition system utilizes the cross-entropy loss formulation shown in Equation 1 above with the softmax classifier to train the font classification neural network 230.

During training, the font recognition system provides the font classification prediction 244 to the font classification loss model 242. The font classification loss model 242 compares the identified font indicated in the font classification prediction 244 to the actual font employed in the training text image to determine an amount of font classification error loss (or simply "classification error loss"). Indeed, the font recognition system can compare the font classification prediction 244 to font classifications 208 from the training data 202 to determine the accuracy and/or classification error loss of the font classification.

In some embodiments, the font classification loss model 242 utilizes a softmax font classifier cross-entropy loss and/or mean square error computations to determine the amount of classification error loss. For instance, the font classification loss model 242 identifies when a font classification prediction 244 is beyond a threshold distance from font features corresponding to the ground-truth font classification (i.e., font classifications 208) within the font classification vector space, and/or how far beyond the threshold distance (e.g., classification error loss) the font classification prediction 244 is from the font classifications 208.

Again, using the error loss (e.g., classification error loss) to train and optimize the neural network layers of the font classification neural network 230, the font recognition system can utilize back propagation and end-to-end learning to tune feature extraction parameters within layers of the font classification neural network 230. For instance, in one or more embodiments, the font recognition system takes the classification error loss output from the font classification loss model 242 and provides it back to the lower neural network layers 232 to further tune the font feature extraction parameters and/or the higher neural network layers 236 to further tune the font classification parameters until the classification error loss from the font classification loss model 242 is minimized. In this manner, the font recognition system iteratively trains the font classification neural network 230 to learn a set of best-fit parameters that extract font features from a font character image and accurately classifies (e.g., predicts or identifies) the font within the image.

In one or more embodiments, the font recognition system trains the font tag recognition neural network 210 and the font classification neural network 230 separately using the same training data 202. In alternative embodiments, the font recognition system concurrently trains the two font neural networks using the same font character images 204 from the training data 202 along with other portions of the training data 202 corresponding to each neural network (e.g., the font tags 206 with the font tag recognition neural network 210 and the font classifications 208 with the font classification neural network 230).

In some embodiments, the font recognition system trains one neural network, then adds one or more layers of the second neural network to the first trained neural network and fine-tunes the additional layers. For example, the font recognition system trains or obtains a pre-trained font classification neural network 230. Then, the font recognition system adds the neural network layers of the font tag recognition neural network 210 to the end of the font classification neural network and fine-tunes the overall neural network to generate font tag probabilities.

After training the font tag recognition neural network 210 and the font classification neural network 230 (or obtaining a pre-trained font classification neural network), the font recognition system can implicitly inject font classification information from the font classification neural network 230 into the font tag recognition neural network 210 to improve the accuracy of the font tag probabilities. To illustrate, FIG. 2B shows the font recognition system introducing an implicit font classification attention model 250 that can merge implicit font classification information from the font classification neural network 230 with the tag feature vectors 214 of the font tag recognition neural network 210.

More particularly, FIG. 2B illustrates a compacted version of the font classification neural network 230 that represents the font classification neural network 230 illustrated in FIG. 2A. In some embodiments, the font classification neural network 230 shown in FIG. 2B includes variations from the font classification neural network illustrated in FIG. 2A. For example, the font classification neural network 230 shown in FIG. 2B may include more or less fully-connected layers and/or a different classifier type within the higher neural network layers 236.

As mentioned above, FIG. 2B illustrates the implicit font classification attention model 250. As shown, the implicit font classification attention model includes higher neural network layers 254. In some embodiments, the implicit font classification attention model also includes a classifier within the higher neural network layers 254, such as a sigmoid function.

For ease of explanation, FIG. 2B illustrates the implicit font classification attention model being separate from the font classification neural network 230. In alternative embodiments, the implicit font classification attention model is embedded into the font classification neural network 230, such as added on as a second set of higher neural network layers and/or additional fully-connected layers. For example, in some embodiments, the implicit font classification attention model replaces the softmax classifier of the font classification neural network 230 and adds one or more additional fully-connected layers as well as a sigmoid classifier (i.e., a sigmoid function). In this manner, the implicit font classification attention model is a sub-network of the font classification neural network 230.

In various embodiments, the implicit font classification attention model 250 converts the m-dimensional output of the font classification predictions 244 into n-dimensions to match the dimensionality of the font tag recognition neural network 210. Indeed, the implicit font classification attention model learns to generate a font classification attention map 256 that maps m-dimensional font classification predictions vectors into n-dimensions for each font.

In one or more embodiments, the implicit font classification attention model 250 utilizes a sigmoid function within the higher neural network layers 254 that outputs a probability vector where each entry ranges from [0-1]. In these embodiments, the implicit font classification attention model 250 creates an n-dimensional font classification attention map 256 (based on an m-dimensional input from the font classification neural network 230) that provides learned weights that indicates an implicit correspondence between font classifications and font tags for each font.

As mentioned above, the font recognition system can utilize the font classification attention map 256 to inject implicit font classification information into the font tag recognition neural network 210 to generate enhanced font tag probabilities. As shown, the font recognition system provides the font classification attention map 256 for a font to a combiner 226 within the font tag recognition neural network 210. In various embodiments, the combiner 226 is located prior to the higher neural network layers 216 of the font tag recognition neural network 210 (e.g., at the hidden deep feature or node level). In this manner, the font recognition system combines (i.e., at the combiner 226) the font classification attention map 256 and a tag feature vector for the same font within the font tag recognition neural network 210 before feeding the weighted tag recognition feature vectors 228 to the higher neural network layers 216 of the font tag recognition neural network 210.

As an example, the font recognition system provides a font character image 204 of a font to the font tag recognition neural network 210 and the font classification neural network 230. The font tag recognition neural network 210 generates a tag feature vector 214 for the font. Concurrently, the font classification neural network 230 generates a font classification prediction 244 (or unclassified font classification prediction coefficients), which are provided to the implicit font classification attention model 250. The implicit font classification attention model in turn creates the font classification attention map 256 for the font.

Next, the font recognition system performs element-wise multiplication of the tag feature vector 214 and the font classification attention map 256 at the combiner 226 to obtain a font classification weighted feature vectors 228 (or simply "weighted feature vector 228"). In alternative embodiments, the combiner 226 combines the tag feature vector 214 and the font classification attention map 256 in a manner other than element-wise multiplication. The font recognition system then feeds the weighted feature vector 228 to the higher neural network layers 216 (e.g., including a sigmoid function) of the font tag recognition neural network 210 to generate enhanced font tag probabilities 260 for the font. In this manner, the weighted feature vector 228 incorporates the implicit font classification information from the font classification neural network 230 into the weighted feature vector 228, which the font recognition system utilizes to generate the enhanced font tag probabilities 260 for the font.

In one or more embodiments, the font recognition system jointly trains the font tag recognition neural network 210 and the implicit font classification attention model 250 to improve the accuracy of generating enhanced font tag probabilities 260. Indeed, the font recognition system jointly trains the font tag recognition neural network 210 and the implicit font classification attention model 250 to learn how to optimally extract implicit font classification information (e.g., represented in the font classification attention map 256) as well as utilize the implicit font classification information to improve font tag recognition by the font tag recognition neural network 210. In this manner, the font recognition system utilizes joint training to fine-tune the font tag recognition neural network 210 and the implicit font classification attention model 250 to more accurately learn how to incorporate the implicit font information from the font classification neural network 230 into font tag probability predictions.

Accordingly, in various embodiments, the font recognition system trains the higher neural network layers 216 of the font tag recognition neural network 210 with the implicit font classification attention model 250 while keeping the lower neural network layers 212 of the font tag recognition neural network 210 and the font classification neural network 230 fixed. For example, during training, the font recognition system provides tag error loss from the font tag recognition loss model to the higher neural network layers 216 and the implicit font classification attention model 250. In some embodiments, the font recognition system alternates providing the tag error loss between the higher neural network layers 216 and the implicit font classification attention model 250 until one or both networks converge. In alternative embodiments, the font recognition system jointly trains by providing the tag error loss simultaneously to the higher neural network layers 216 and the implicit font classification attention model 250.

As mentioned above, in jointly training the higher neural network layers 216 of the font tag recognition neural network 210 with the implicit font classification attention model 250, the font recognition system fixes the tunable parameters of the lower neural network layers 212 of the font tag recognition neural network 210 and the font classification neural network 230. In some embodiments, the font recognition system further tunes one or more of these layers/networks. For example, the font recognition system trains the font classification neural network 230 in connection with training the layers of the implicit font classification attention model 250.

By way of additional context with respect to Equation 1, for each glyph $I_i^j$, the font recognition system indicates the predicted font class distribution, which is represented as $c_i^j$ (e.g., a font classification feature vector 234). Next, the font recognition system feeds $c_i^j$ into the implicit font classification attention model 250. As mentioned above, in some embodiments, the implicit font classification attention model 250 includes a fully-connected layer with a sigmoid unit, which transforms $c_i^j$ into a font classification attention map 256, represented as $B_i^j$, where $B_i^j$ has n-dimensions matching the hidden feature vector $f_i^j$ described above from the font tag recognition neural network 210. Further, each of the n-elements or nodes within $B_i^j$ has a range of [0-1].

FIG. 2B provides one example architecture of neural networks for the font recognition system to generate enhanced font tag probabilities 260. The font recognition system can alternatively employ other architectures. For example, in one embodiment, the font recognition system concurrently trains the font tag recognition neural network 210 and the font classification neural network 230 using a shared error loss model in a multi-task framework to capture the font class knowledge (i.e., implicit font classification information) within the font tag recognition neural network 210. In another embodiment, the font recognition system first trains the font classification neural network 230, then fine-tunes the neural network for tag probability predictions (e.g., enhanced font tag probabilities 260). Other architectures and configurations are also possible.

As shown in FIG. 2C, an example architecture of the font tag recognition neural network 210 is illustrated. As mentioned above, in many embodiments, this architecture is similar to the architecture of the font classification neural network 230. To provide context, FIG. 2C includes the font recognition system providing the training data 202 to the font tag recognition neural network 210 that generates the initial font tag probabilities 224, as described above.

In particular, the font tag recognition neural network 210 in FIG. 2C shows that lower neural network layers 212 includes five convolutional layers. In some embodiments, a rectified linear unit (ReLU) non-linearity is applied to the output of each convolutional and fully connected layer. In addition, in various embodiments, the font tag recognition neural network 210 includes two normalization layers and/or two max-pooling layers. FIG. 2C also includes example neuron dimensions for each layer (i.e., 48×48×64 neurons for the first convolutional layer).

The font recognition system feeds the tag feature vectors 214 outputted from the lower neural network layers 212 to the higher neural network layers 216, as explained earlier. As shown, the higher neural network layers 216 include fully-connected layers (i.e., fc6, fc7, fc8) and a classifier function 258. As shown, the first two fully-connected layers are 4,096-dimensional while the last fully-connected layer is 2,383-dimension. In this example, 2,383 indicates 2,383 font tags (or 2,383 fonts in the case of a font classification neural network 230). In this manner, the classifier function 258 outputs a 2,383-dimension initial font tag probability vector.

As mentioned above, the architecture between the font tag recognition neural network 210 and the font classification neural network 230 can be similar. For example, in some embodiments, the architecture is the same between the two neural networks except for the classifier function 258. For example, in the case of the font tag recognition neural network 210, the classifier function 258 is a sigmoid function. In the case of the font classification neural network 230, the classifier function 258 is a softmax classifier.

Moreover, in some embodiments, the font recognition system utilizes the ResNet-50 architecture as the basic CNN architecture for the font tag recognition neural network 210 and/or the font classification neural network 230. In alternative embodiments, the font recognition system utilizes the ResNet-18 architecture. Further, in some embodiments, the font recognition system can employ a learning rate of 0.00005 for the convolutional layers and of 0.0005 for the fully-connected layers.

FIGS. 2A-2C described various embodiments of jointly training the font tag recognition neural network with an implicit font classification attention model. Accordingly, the actions and algorithms described in connection with FIGS. 2A-2C provide an example structure and architecture for performing a step for jointly training the font tag recognition neural network 210 with an implicit font classification attention model 250 within the font classification neural network 230 to generate a font classification attention map 256 for each of the plurality of fonts that extracts and applies implicit font information from the training font images to the font tag recognition neural network 210.

Indeed, FIGS. 2A-2C provide detail for identifying training font images (e.g., font character images 204) of a plurality of fonts, where each training font image includes a font tag (e.g., font tags 206) and a font classification (e.g., font classifications 208) of a font included in the training font image. Further, FIGS. 2A-2C provide detail for training a font tag recognition neural network 210 to determine initial font tag probabilities 224 for each font of the plurality of fonts using the font training images and corresponding font tags as well as training a font classification neural network 230 to classify the plurality of fonts using the font training images and corresponding font classifications. Furthermore, FIGS. 2A-2C provide detail for generating, by the trained font tag recognition neural network, enhanced font tag probabilities 260 for a font of the plurality of fonts based on the font classification attention map 256.

Figure 3:
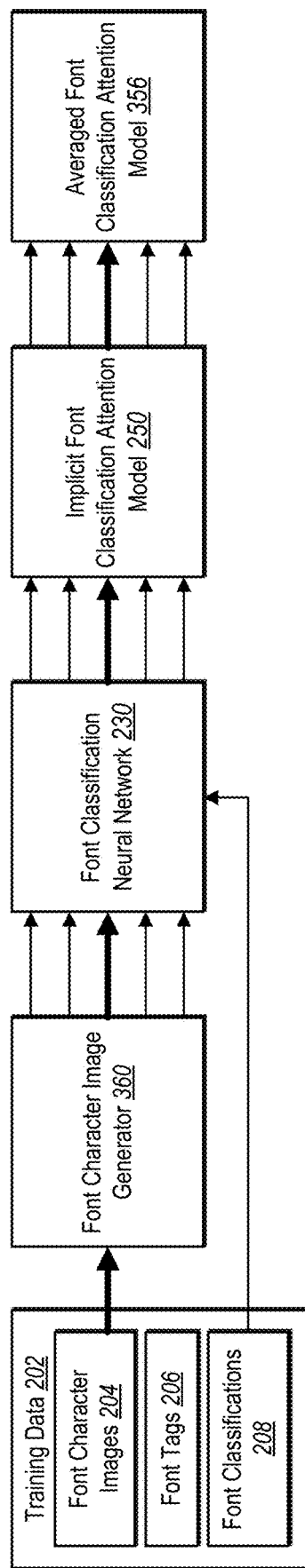
FIG. 3 illustrates a diagram of generating a robust font classification attention map in accordance with one or more embodiments.

Turning now to FIG. 3, additional detail is provided regarding creating a more robust font classification attention map for each font included in the training data 202. More particularly, the actions described in connection with FIG. 3 primarily relate to training the font classification neural network 230 and the implicit font classification attention model 250, as described above in connection with FIG. 2B.

As described previously, the font recognition system provides a font character image to the font classification neural network 230 (e.g., indicated by the bold arrow). In additional embodiments, the font recognition system generates additional font character images having the same font as the provided font character image. To illustrate, FIG. 3 shows the font recognition system first providing the font character image to a font character image generator 360. For example, the font recognition system provides the font character image from the font character images 204 of the training data 202 to the font character image generator 360. In another example, the font recognition system provides an indication of the font included in the font character image to the font character image generator 360.

The font character image generator 360 can generate additional font character images that utilize the same font included in the original font character image. In one or more embodiments, the font character image generator randomly selects multiple strings of characters (e.g., at least 5 random glyphs per string) from the font and renders the strings as additional font character images. For example, the character image generator 360 generates four additional images per font. The font recognition system then provides the additional font character images to the font classification neural network 230 and the implicit font classification attention model 250 (e.g., indicated by the non-bold arrows) to generate font classification attention maps (e.g., font classification attention map 256) for each of the additional font character images.

Further, the font recognition system can combine the font classification attention map for the font character image with the font classification attention maps for the additional font character images to obtain an averaged font classification attention map 356. For example, in one or more embodiments, the font recognition system averages the font classification attention maps to determine the averaged font classification attention map 356, which is then provided to the font tag recognition neural network 210 at the node level, as previously described above in connection with FIG. 2B. The averaged font classification attention map 356 can better extract the implicit font classification information for the font than a single font classification attention map. In this manner, the averaged font classification attention map 356 provides robustness that enables the font tag recognition neural network 210 to generate more accurate enhanced font tag probability vectors.

Explaining FIG. 3 in another way, for the input image $I_i^j$, the font recognition system randomly selects another x images $I_i^{j1}, \ldots, I_i^{jx}$ (e.g., 4 additional images) with different characters $L_{j1}, \ldots, L_{jx}$ but all with the same font (i.e., $F_i$). The font recognition system then predicts font classification attention maps for each image, represented as $B_i^{j1}, \ldots, B_i^{jx}$. Further, the font recognition system then calculates the averaged font classification attention map 356 using the formulation shown in Equation 2 below. In Equation 2, ⊙ represents an element-wise multiplication between each font classification attention map.

$$B_i = B_i^j \odot B_i^{j1} \odot \ldots \odot B_i^{jx} \quad (2)$$

Then, using the averaged font classification attention map 356 (i.e., $B_i$), the font recognition system injects the averaged font classification attention map 356 into the font tag recognition neural network 210. In particular, the font recognition system can perform an element-wise multiplication between $f_i^j$ and $B_i$ to obtain the re-weighted hidden feature of $I_i^j$ (e.g., a weighted tag recognition feature vector 228)), which the font recognition system then feeds into the top fully-connected layer of the font tag recognition neural network 210, as described above. Overall, the random selection of multiple glyph images of a single font improves the accuracy and discriminability of the averaged font classification attention map 356 for the font.

Upon jointly training the font tag recognition neural network 210 with the injected implicit font classification information, the font recognition system can utilize the enhanced font tag probabilities for each font to retrieve fonts based on text queries of font tags. As mentioned above, conventional systems detect or predict fonts based on an input image. In contrast, the font recognition system can retrieve one or more fonts based on a text query rather than an image query. To illustrate, FIG. 4 shows a diagram of retrieving fonts based on a font tag query in accordance with one or more embodiments.

Figure 4:
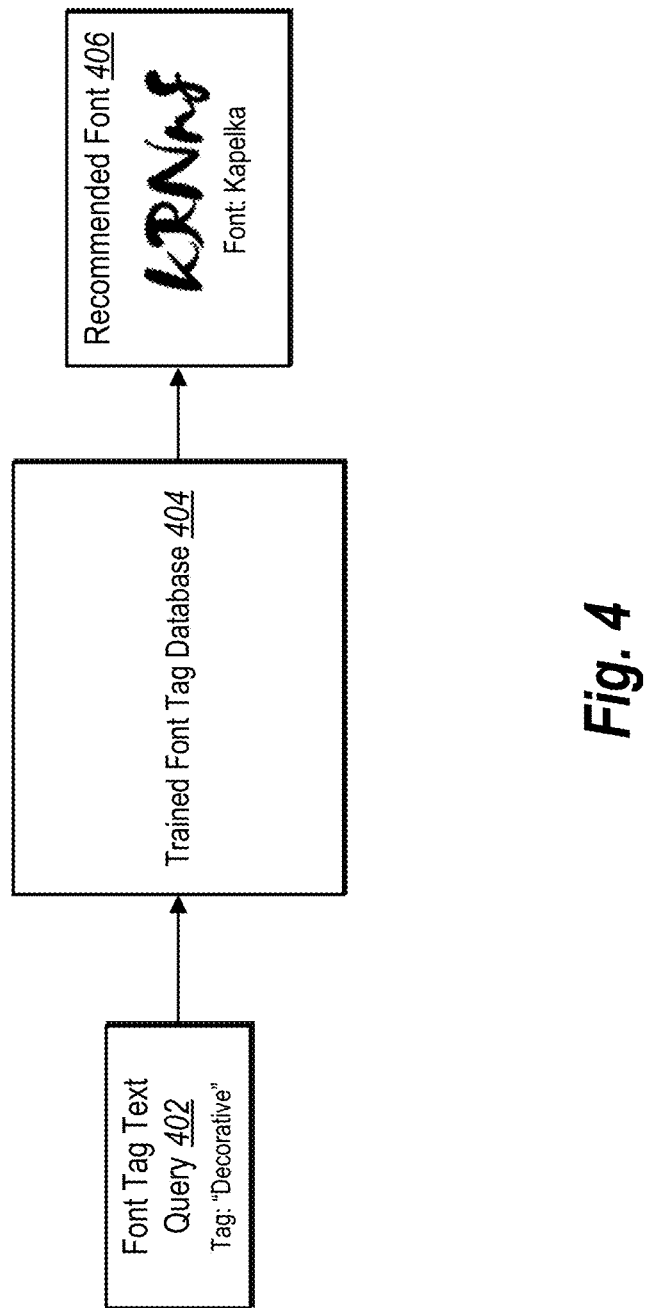
FIG. 4 illustrates a diagram of retrieving fonts based on a font tag query in accordance with one or more embodiments.

As shown, FIG. 4 includes a font tag query 402 (i.e., the font tag of "Decorative"), a trained font tag database 404, and a recommended font 406 (i.e., the font of "Kapelka"). In various embodiments, the font recognition system receives the font tag query 402 as a text query from a user (or another entity). In response, the font recognition system utilizes the trained font tag database 404 to identify one or more recommended fonts that correspond to the font tag query 402. Further, the font recognition system provides the identified one or more recommended fonts (e.g., the recommended font 406) to the user in response to the text query.

The trained font tag database 404 includes a collection of enhanced font tag probabilities for each font and font tag in the training data. As described above, the font recognition system trains the font tag recognition neural network to generate enhanced font tag probabilities for each font, where the enhanced font tag probabilities (from 0%-100%) for a font indicate the probability that the font corresponds to each font tag. In various embodiments, the font recognition system stores the correlation between each font and font tag in the trained font tag database 404. The font recognition system repeats these actions for each font in the training data with respect to all the font tags.

The trained font tag database 404 can include various tables and/or be organized in a variety of configurations. For example, the font recognition system includes a first table that lists each font along with the probability that each font tag corresponds to a given font. Further, in additional embodiments, the font recognition system generates a second table (e.g., converts the first table) that includes a listing of the font tags, where each font tag indicates the probability that each font corresponds to the font tag. In this manner, the font recognition system can quickly identify a font tag from a font tag query 402 in the trained font tag database 404 and retrieve the font having the highest probability correspondence with the identified font tag. Similarly, the font recognition system can retrieve and recommend the top x number of fonts that correspond to the identified font tag (e.g., the font tag from a font tag query).

In some embodiments, the font tag query 402 includes multiple font tags. In these embodiments, the font recognition system can utilize the trained font tag database 404 to retrieve and recommend the font that best corresponds to the multiple font tags. For example, in one or more embodiments, the font recognition system identifies each of the multiple font tags in the font tag query 402 and extracts the corresponding font probabilities for the multiple font tags. In addition, the font recognition system can sum, average, or otherwise normalize the corresponding font probabilities between the multiple font tags to identify one or more highest (e.g., most favorable) fonts that best suit the multiple font tags in the font tag query 402.

When the font tag query 402 includes multiple font tags, the font recognition system can apply different weights to each of the font tags in the font tag query 402. To illustrate, in one or more embodiments, the font recognition system weights the font tags based on commonality, usage, and/or popularity. For example, the font recognition system weights more common font tags over less common font tags. Alternatively, the font recognition system weights less common font tags over the more common font tags. In this manner, the font recognition system can give greater weight to some font tags in the font tag query 402 when retrieving and recommended fonts in response to a font tag query 402.

The font recognition system can occasionally update the trained font tag database 404 to include new fonts, font tags, or to improve existing learned font tag retrieval data. For example, the font recognition system identifies a new font missing from the trained font tag database 404. The font recognition system can generate font character images and ground-truth data as new training data and feed the new training data to the trained font tag recognition neural network, trained font classification neural network, and the trained implicit font classification attention model. Using the actions and processes described above in connection with FIG. 2B, the font recognition system can generate enhanced font tag probabilities for the new font. In addition, the font recognition system can update the trained font tag database 404 to include the new or updated enhanced font tag probabilities.

In various embodiments, the font recognition system can provide and utilize the trained font tag database 404 on a mobile client device to retrieve fonts. Indeed, the font recognition system can utilize the trained font tag database 404 to retrieve and recommend fonts to a user in response to font tag queries without the need to create, train, execute, or store the font tag recognition neural network and/or font classification neural network, which some modern mobile client devices would struggle to accomplish. In this manner, the font recognition system can train and generate the trained font tag database 404 on a server device and provide the compact trained font tag database 404 to a mobile client device, enabling most modern mobile client devices to quickly and efficiently retrieve fonts in response to font tag queries.

Figure 5:
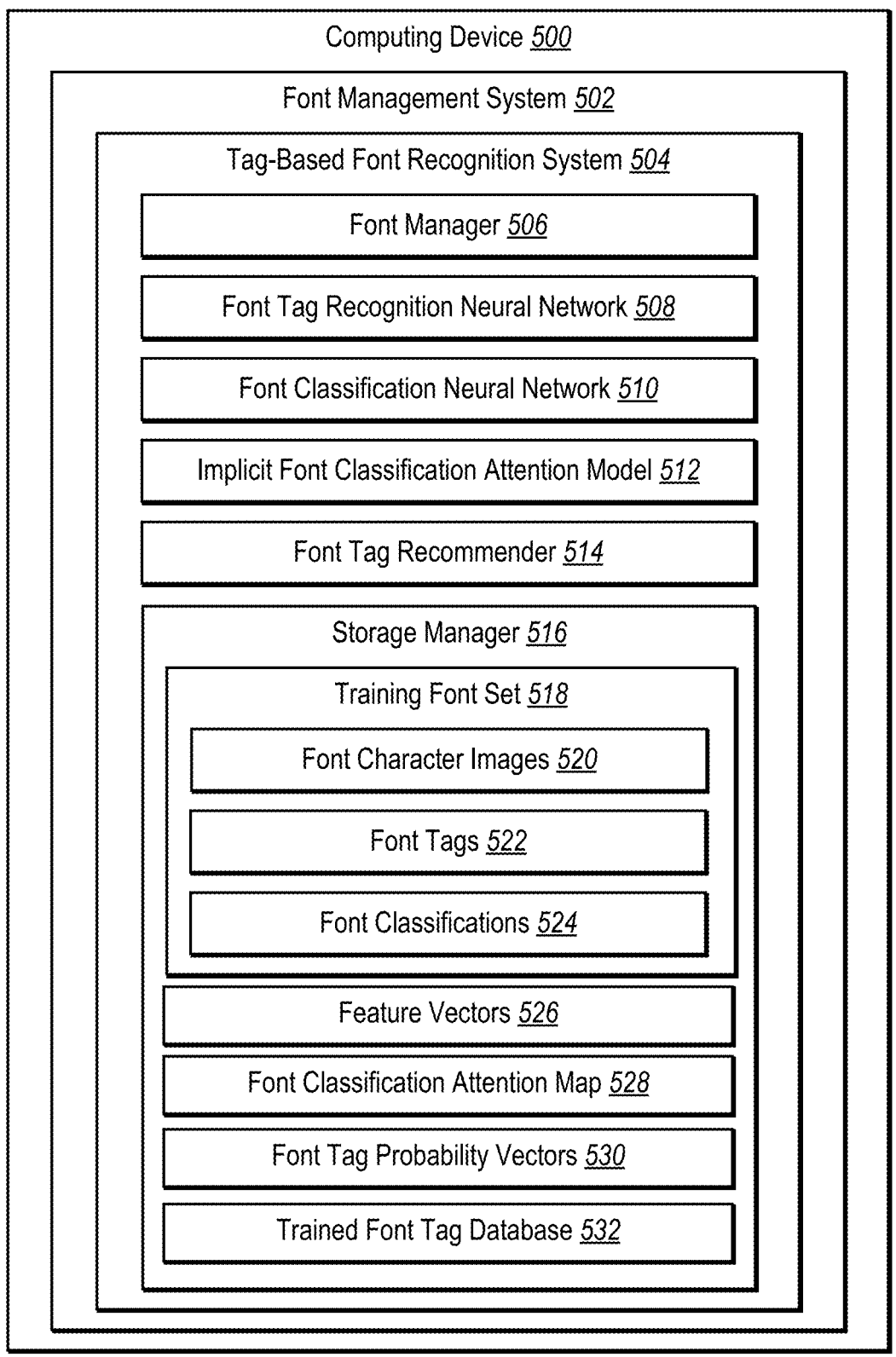
FIG. 5 illustrates a schematic diagram of a tag-based font recognition system in accordance with one or more embodiments.

Referring now to FIG. 5, additional detail will be provided regarding capabilities and components of the font recognition system (i.e., tag-based font recognition system) in accordance with one or more embodiments. In particular, FIG. 5 shows a schematic diagram of an example architecture of the tag-based font recognition system 504 (or simply "font recognition system 504") located within a font management system 502 and hosted on a computing device 500. The font recognition system 504 can represent one or more embodiments of the font recognition system described previously.

As shown, the font recognition system 504 is located on a computing device 500 within a font management system 502. In general, the computing device 500 may represent various types of client devices. For example, in some embodiments, the client is a mobile device, such as a mobile telephone, a smartphone, a PDA, a tablet, a laptop, etc. In other embodiments, the computing device 500 is a non-mobile device, such as a desktop or server, or another type of client device. In some embodiments, portions of the computing device 500 correspond to computing devices of different types (e.g., some components operate on the computing device 500 when acting as a server device and some components operate on the computing device 500 when acting as a client device). Additional details with regard to the computing device 500 are discussed below as well as with respect to FIG. 10.

The font management system 502, in general, facilitates the creation, modification, sharing, installation, receipt, and/or deletion of digital fonts within electronic documents and/or system applications. For example, the font management system 502 stores a repository of fonts on the computing device 500, such as in a font database (not shown). In addition, the font management system 502 can access additional fonts located remotely. Further, in some embodiments, the font management system 502 can be located separately from the computing device 500 and provide fonts to the computing device 500. In one or more embodiments, the font management system 502 comprises ADOBE® TYPEKIT®.

In addition, the font management system 502 can operate in connection with one or more applications to display fonts on the computing device 500. For example, in one or more embodiments, the font management system 502 provides fonts to a word processing application such as ADOBE® ACROBAT®, ADOBE® INDESIGN®, or another word processing application. In other embodiments, the font management system 502 provides fonts to a design application such as ADOBE® ILLUSTRATOR®.

As illustrated in FIG. 5, the font recognition system 504 includes various components. For example, the font recognition system 504 includes a font manager 506, a font tag recognition neural network 508, a font classification neural network 510, an implicit font classification attention model 512, a font tag recommender 514, and a storage manager 516. Each of these components is described below in turn.

The font manager 506 can store, receive, detect, install, order, and/or organize fonts within the computing device 500. For example, in one or more embodiments, the font manager 506 stores a set of fonts on the computing device 500. In some embodiments, the font manager 506, in connection with the font management system 502, maintains fonts within a font database. For example, the font manager 506 maintains a set of fonts that a user can employ in an electronic document. In an additional example, the font manager 506 maintains a training font set 518. In various embodiments, the font manager 506 can identify and access additional fonts not stored or located on the computing device 500.

The font manager 506 can generate the training font set 518 used to train the font tag recognition neural network 508, the font classification neural network 510, and the implicit font classification attention model 512. For example, the font manager 506 renders font character images 520 from random characters (i.e., glyphs) for each font in a font set, as previously described. In addition, the font manager 506 associates font tags 522 and font classifications 524 with each of the rendered font character images 520. In some embodiments, the font manager 506 stores the generated training font set 518 (including font character images 520, font tags 522, and font classifications 524) in the storage manager 516.

As shown in FIG. 5, the font recognition system 504 includes the font tag recognition neural network 508. As described above, the font recognition system trains the font tag recognition neural network 508 to learn a correlation between fonts and font tags. The font tag recognition neural network 508 can include multiple neural network layers, such as convolutional layers, fully-connected layers with a sigmoid function classifier, and loss layers. Example architecture of the font tag recognition neural network 508 is provided above with respect to FIGS. 2A-2C.

In addition, the font tag recognition neural network 508 can generate feature vectors 526, such as font tag recognition feature vectors that encode deep or hidden visual effects of fonts in relation to font tags. In addition, the font tag recognition neural network 508 can generate font tag probability vectors 530. For example, the font tag recognition neural network 508 first generates initial font tag probability vectors, then upon further training generates enhanced font tag probability vectors that incorporate implicit font classification information (e.g., from a font classification attention map 528, as described above.

As also shown in FIG. 5, the font recognition system 504 includes the font classification neural network 510. As described above, the font recognition system trains the font classification neural network 510 to learn to classify fonts based on font images. The font classification neural network 510 can include multiple neural network layers, such as convolutional layers, fully-connected layers with a softmax function classifier, and loss layers. Example architecture of the font tag recognition neural network 508 is provided above with respect to FIGS. 2A-2C. The font classification neural network 510 can also generate feature vectors 526 (e.g., font classification feature vectors) and font classification prediction vectors, as described previously.

In addition, FIG. 5 shows the implicit font classification attention model 512. As explained earlier, the implicit font classification attention model 512 converts implicit font classification information from the font classification neural network 510 into a font classification attention map 528, which is injected into the node level of the font tag recognition neural network 508 via the font classification attention map 528. The font classification neural network 510 can include fully-connected layers with a sigmoid function classifier. Example architecture of the implicit font classification attention model is provided above with respect to FIG. 2B.

As shown, the font recognition system 504 includes the font tag recommender 514. The font tag recommender 514 can receive fonts in response to a font tag query. For example, the font tag recommender 514 identifies one or more font tags within a trained font tag database 532, determines corresponding fonts, and retrieves the fonts best matching the font tag query. In addition, the font recognition system 504 provides the retrieved fonts as recommended fonts in response to the font tag query.

Further, as shown, the font recognition system 504 includes the storage manager 516. The storage manager 516 communicates with other components of the font recognition system 504 to store, maintain, and access data used to train the font neural networks and models disclosed herein (e.g., the training font set 518, feature vectors 526, the font classification attention map 528, and the font tag probability vectors 530). In addition, the storage manager 516 stores and maintains the trained font tag database 532, which is described above.

Each of the components 506-532 of the font recognition system 504 can include software, hardware, or both. For example, the components 506-532 can include one or more instructions stored on a computer-readable storage medium and executable by processors of one or more computing devices, such as a client device or server device. When executed by the one or more processors, the computer-executable instructions of the font recognition system 504 can cause the computing device(s) to perform the feature learning methods described herein. Alternatively, the components 506-532 can include hardware, such as a special-purpose processing device to perform a certain function or group of functions. Alternatively, the components 506-532 of the font recognition system 504 can include a combination of computer-executable instructions and hardware.

Furthermore, the components 506-532 of the font recognition system 504 may, for example, be implemented as one or more operating systems, as one or more stand-alone applications, as one or more modules of an application, as one or more plug-ins, as one or more library functions or functions that may be called by other applications, and/or as a cloud computing model. Thus, the components 506-532 may be implemented as a stand-alone application, such as a desktop or mobile application. Furthermore, the components 506-532 may be implemented as one or more web-based applications hosted on a remote server. The components 506-532 may also be implemented in a suite of mobile device applications or "apps." To illustrate, the components 506-532 may be implemented in an application, including but not limited to ADOBE® TYPEKIT®, ADOBE® INDESIGN®, ADOBE ACROBAT®, ADOBE® ILLUSTRATOR®, ADOBE PHOTOSHOP®, ADOBE® CREATIVE CLOUD® software. "ADOBE," "INDESIGN" "ACROBAT," "ILLUSTRATOR," "PHOTOSHOP," and "CREATIVE CLOUD" are either registered trademarks or trademarks of Adobe Inc. in the United States and/or other countries.

Figure 6:
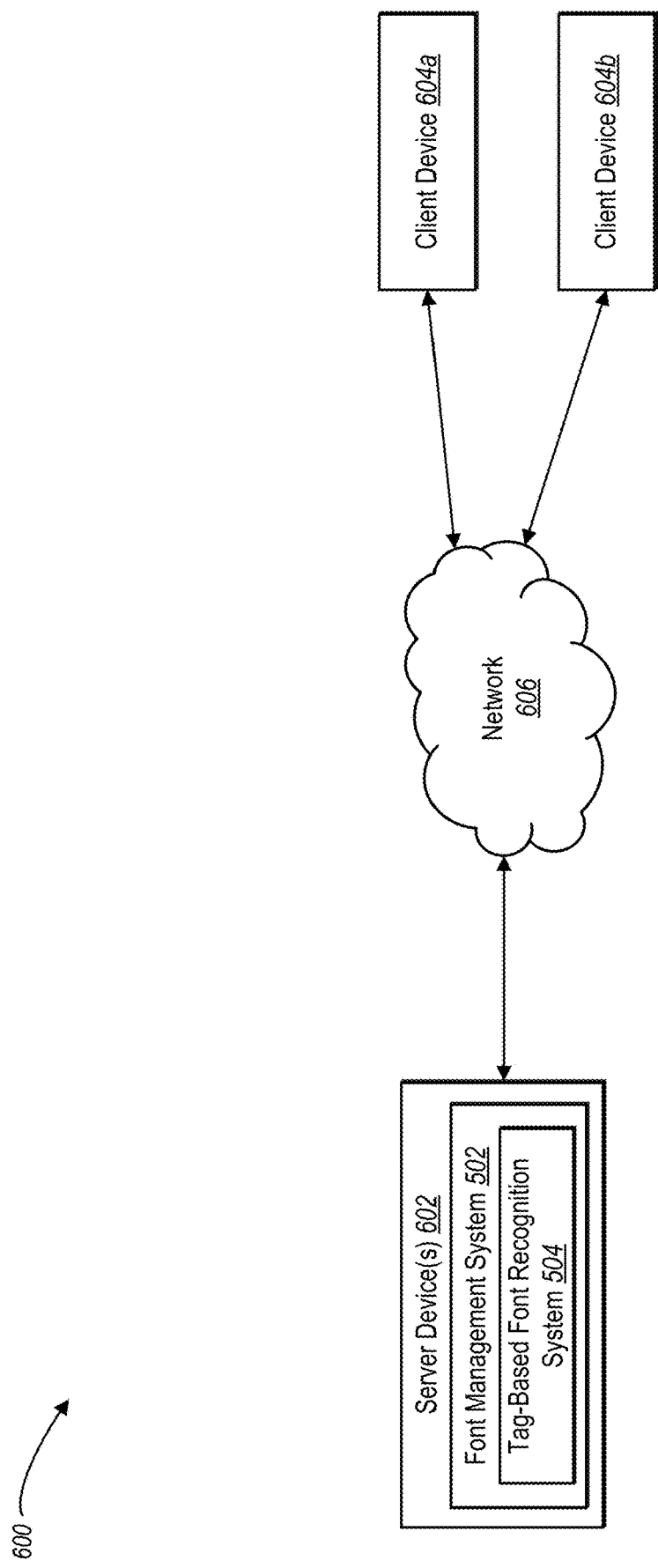
FIG. 6 illustrates a schematic diagram of an example environment in which the tag-based font recognition system may be implemented in accordance with one or more embodiments.

FIG. 6 illustrates a schematic diagram of an environment 600 in which the tag-based font recognition system 504 (or simply "font recognition system 504") may be implemented in accordance with one or more embodiments. In one or more embodiments, the environment 600 includes various computing devices including server device(s) 602 and one or more client devices 604a, 604b. In addition, the environment 600 includes a network 606. The network 606 may be any suitable network over which the computing devices can communicate. Example networks are discussed in more detail below with regard to FIG. 10.

As illustrated in FIG. 6, the environment 600 includes the server device(s) 602, which may comprise any computing device, such as one or more of the computing devices described below in relation to FIG. 10. In addition, the server device(s) 602 includes the font management system 502 and the font recognition system 504, which are described previously. For example, as described above, the font recognition system 504 can train and apply font tag recognition neural networks to learn correlations between fonts and font tags based on implicit font classification information as well as retrieve fonts based on a font tag query.

In addition, the environment 600 includes the one or more client devices 604a, 604b. The client devices 604a, 604b may comprise any computing device, such as the computing device described below in relation to FIG. 10. As described above, the one or more client devices 604a, 604b can utilize the trained font tag database to retrieve fonts based on a font tag query.

As illustrated, in one or more embodiments, the server device(s) 602 can include all, or a portion of, the font recognition system 504. In particular, the font recognition system 504 can comprise an application running on the server device(s) 602 or a portion of a software application that can be downloaded from the server device(s) 602. For example, the font recognition system 504 can include a web hosting application that allows a client device 604a to interact with content hosted on the server device(s) 602. To illustrate, in one or more embodiments of the environment 600, the client device 604a accesses a web page supported by the server device(s) 602. In particular, the client device 604a can run an application to allow a user to access, view, select, identify, and/or recommend a font from a font tag query within a web page or website hosted at the server device(s) 602 (e.g., a web page enables a user to provide a font tag query, and in response recommends one or more fonts).

Although FIG. 6 illustrates a particular arrangement of the server device(s) 602, the client devices 604a, 604b and the network 606, various additional arrangements are possible. For example, while FIG. 6 illustrates the one or more client devices 604a, 604b communicating with the server device(s) 602 via the network 606, in one or more embodiments a single client device may communicate directly with the server device(s) 602, bypassing the network 606.

Similarly, although the environment 600 of FIG. 6 is depicted as having various components, the environment 600 may have additional or alternative components. For example, the font recognition system 504 can be implemented on multiple computing devices. In particular, the font recognition system 504 may be implemented in whole by the server device(s) 602 or the font recognition system 504 may be implemented in whole by the client device 604a. Alternatively, the font recognition system 504 may be implemented across multiple devices or components (e.g., utilizing the server device(s) 602 and the one or more client devices 604a, 604b).

Figure 7:
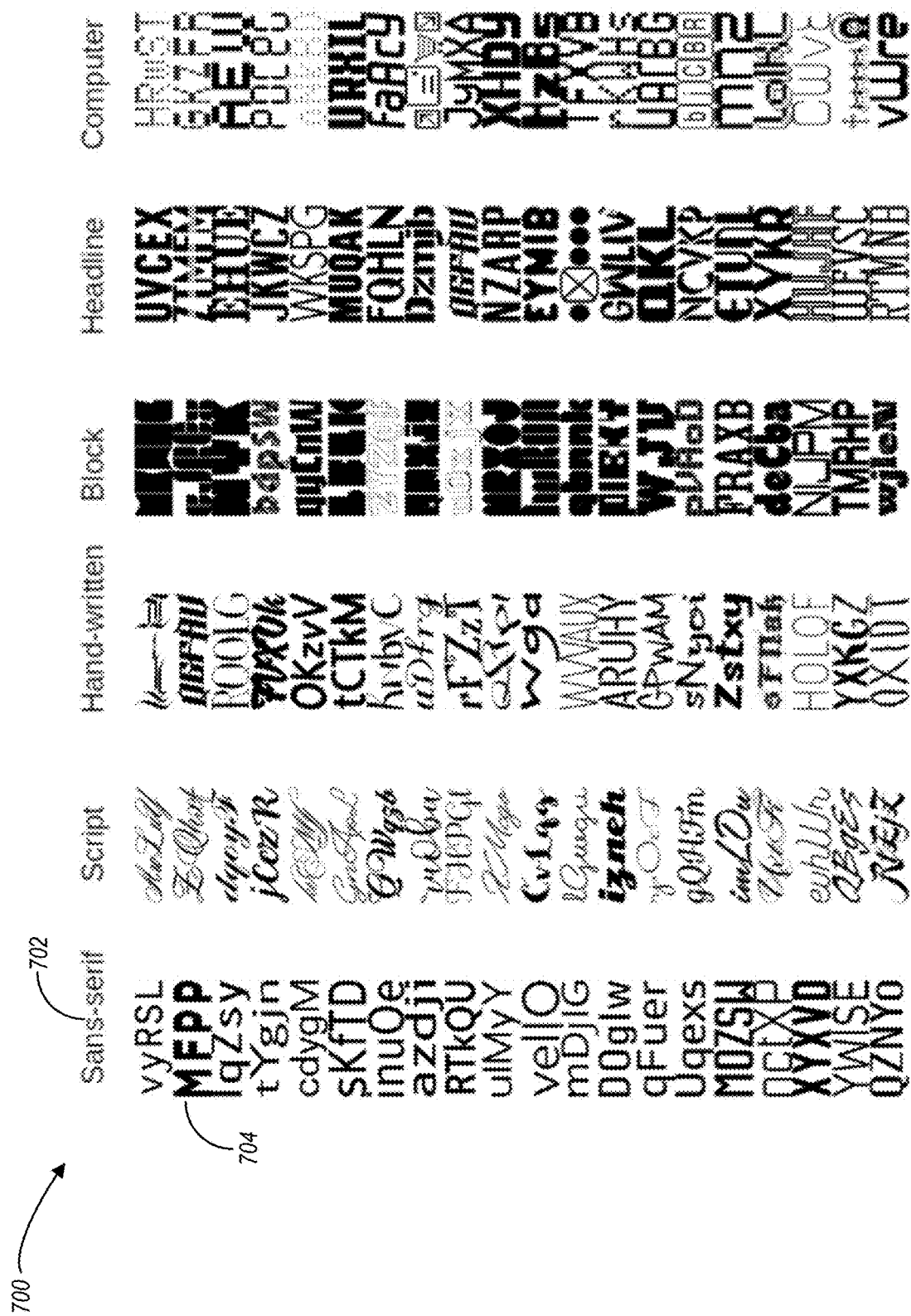
FIG. 7 illustrates example retrieved fonts based on font tag queries in accordance with one or more embodiments.

Turning now to the next figure, FIG. 7. illustrates sample retrieved fonts 700 based on font tag queries in accordance with one or more embodiments. In particular, FIG. 7 includes font tag queries 702 and recommended fonts 704 retrieved by the font recognition system 504 in response to the font tag queries 702, as described above. Indeed, the recommended fonts 704 include the top-20 fonts that correspond to each of the font tag queries 702.

Indeed, FIG. 7 shows qualitative results of the font recognition system 504, where the font recognition system 504 performance well with respect to font retrieval across a variety of font tag queries 702 (e.g., user font tag inputs). For example, results of recommended fonts 704 from category-related tags are shown for the tags "sans-serif," "script," and "handwritten." In addition, results of recommended fonts 704 from utility-related tags are shown for the tag "headline." Further, results of recommended fonts 704 from characteristic-related tags are shown for the tags "block" and "computer."

With respect to quantitative results, as mentioned above, researchers compared embodiments of the font recognition system to baseline neural networks and found that the font recognition system outperformed these baseline neural networks. More particularly, the researchers evaluated the effectiveness of the font recognition system 504 based on a standard retrieval measure of mean average precision (MAP). To illustrate, using the MAP measure, the researchers evaluated M tag queries for a specific query q. By way of context, if the positive fonts $f_1$, $f_2$, $f_3$ . . . $f_N$ receive probability ranks of $r_1$, $r_2$, $r_3$ . . . $r_N$, then, the average precision score of q is computed as shown in Equation 3 below.

$$\text{Average } Precision_q = \sum_{n=1}^{N} \frac{n}{r_n} \quad (3)$$

The font recognition system 504 then calculates the mean values of each the average precision score for each query to obtain the MAP.

To evaluate the embodiments of the font recognition system to the baseline neural networks, the researchers obtained a training set of 19,161 fonts and 1,923 font tags. In particular, the researchers split the 19,161 fonts from the dataset into a training set (80%), a validation set (10%), and a test set (10%), where each font was only included in one of the sets. The researchers then utilized two font tag query lists to evaluate the performance of the different models. The first font tag query list included all 1,923 tags, where each tag was used as a font tag query (i.e., MAP). For each font tag query, the font was marked as positive if the ground-truth tag list contained the corresponding tag of the font tag query. The second font tag query list was limited to frequently used font tags, which have a higher tendency to be searched by users. Specifically, the second font tag query list included the 300 most frequently selected tags in the training set (e.g., MAP-300).

For each of the font tag query lists, the font recognition system 504 computed the MAP using Equation 3, as described above. Table 1 below includes the MAP score comparisons between embodiments of the font recognition system to the baseline neural networks. As shown in Table 1, the baseline neural networks include a baseline pre-trained font tag recognition neural network that does not include any information from a font classification neural network (e.g., trained to generate initial font tag probabilities), a multi-tasked font classification neural network concurrently trained with a font classification neural network, and a pre-trained font classification neural network fine-tuned to perform font tag recognition. Each of these baseline models is described above in connection with embodiments of the font recognition system 504. In addition, Table 1 includes the font tag recognition neural network jointly trained with implicit font classification attention model (shown in bold), as described above, that generates enhanced font tag probabilities.

TABLE 1

| Type Of Font Tag Recognition Model | Implicit Font Classification Information | MAP | MAP-300 |
| --- | --- | --- | --- |
| Baseline | No | 15.0 | 24.0 |
| Multitask Trained | Yes | 14.8 | 23.9 |
| Fine-Tuned Trained | Yes | 15.4 | 24.3 |
| With an Implicit Font classification attention | Yes | 16.7 | 25.3 |

As shown in Table 1, compared with other baseline font tag recognition neural network models, the font tag recognition neural network jointly trained with the implicit font classification attention model outperformed the baseline models with respect to both font tag query lists (e.g., MAP and MAP-300). Indeed, the jointly trained font tag recognition neural network of the font recognition system 504 disclosed herein achieved remarkably better performance than the baseline model, the multi-task model, and the fine-tuned model, which demonstrates its effectiveness to accurately retrieve fonts.

Further, while not shown, the researchers found that the jointly trained font tag recognition neural network of the font recognition system 504 disclosed herein achieved better results over the baseline models with respect to normalized discounted cumulative gain (nDCG). In particular, the jointly trained font tag recognition neural network of the font recognition system 504 disclosed herein particularly performed better with respect to single-tag font tag queries.

Figure 8:
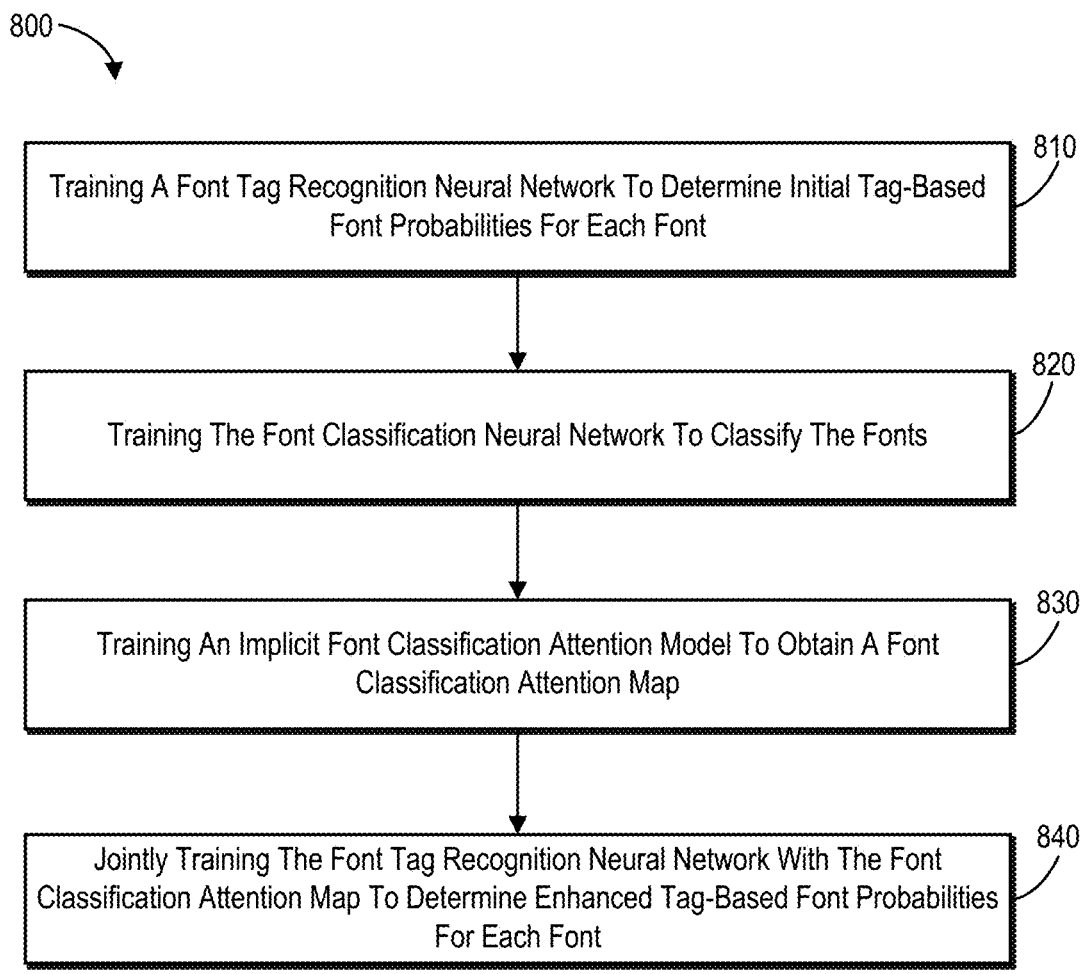
FIG. 8 illustrates a flowchart of a series of acts for generating an enhanced font tag probability vector utilizing a trained font tag recognition neural network and font classification attention map in accordance with one or more embodiments.
Figure 9:
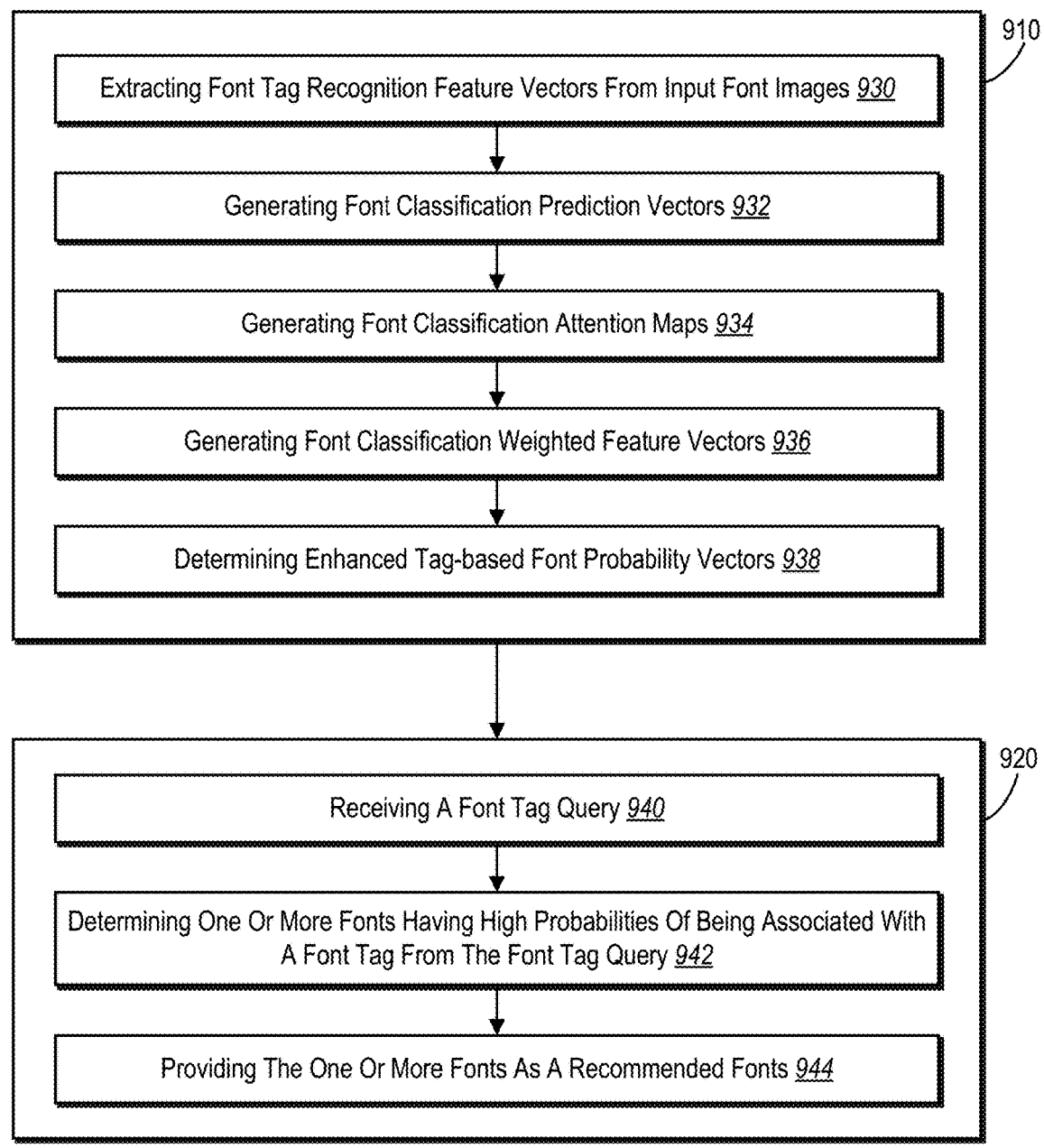
FIG. 9 illustrates a flowchart of a series of acts for recommending fonts based on a font tag query in accordance with one or more embodiments.

FIGS. 1-7, the corresponding text, and the examples provide several different systems, methods, techniques, components, and/or devices of the font recognition system 504 in accordance with one or more embodiments. In addition to the above description, one or more embodiments can also be described in terms of flowcharts including acts for accomplishing a particular result. For example, FIG. 8 and FIG. 9 illustrate flowcharts of an example sequence of acts in accordance with one or more embodiments. In addition, FIG. 8 and FIG. 9 may be performed with more or fewer acts. Further, the acts may be performed in differing orders. Additionally, the acts described herein may be repeated or performed in parallel with one another or parallel with different instances of the same or similar acts.

While FIG. 8 and FIG. 9 illustrate a series of acts according to particular embodiments, alternative embodiments may omit, add to, reorder, and/or modify any of the acts shown. The series of acts of FIG. 8 and FIG. 9 can be performed as part of a method. Alternatively, a non-transitory computer-readable medium can comprise instructions, when executed by one or more processors, cause a computing device (e.g., a client device and/or a server device) to perform the series of acts of FIG. 8 and FIG. 9. In still further embodiments, a system performs the series of acts of FIG. 8 and FIG. 9.

In addition, the series of acts of FIG. 8 and FIG. 9 can be implemented on one or more computing devices, such as the computing device 500 or the server device(s) 602. In addition, in some embodiments, the series of acts of FIG. 8 and FIG. 9 can be implemented in a digital environment for creating or editing electronic documents. In various embodiments, the series of acts of FIG. 8 and FIG. 9 are implemented on a computing device having a memory that stores digital fonts (e.g., font training images corresponding to a plurality of fonts as well as font tags and font classifications corresponding to the font training images). In some embodiments, the memory stores a font classification neural network trained to classify the plurality of fonts using the font training images and the corresponding font classifications.

To illustrate, FIG. 8 shows a flowchart of a series of acts 800 for training a tag-based font recognition system to generate an enhanced font tag probability in accordance with one or more embodiments. As shown, the series of acts 800 includes an act 810 of training a font tag recognition neural network to determine initial tag-based font probabilities for each font. In particular, the act 810 can involve training a font tag recognition neural network to determine initial tag-based font probabilities for each font of the plurality of fonts using the font training images and corresponding font tags. In various embodiments, the font tag recognition neural network includes lower neural network layers and higher fully-connected neural network layers.

In one or more embodiments, the dimensions of font tag recognition feature vectors generated by the lower neural network layers of the font tag recognition neural network include n-dimensions based on a first number of font tags corresponding to the font training images. In various embodiments, the font tag recognition neural network utilizes a first sigmoid probability function to generate the font tag recognition feature vectors. In some embodiments, the font tag recognition neural network includes a first convolutional neural network.

As shown, the series of acts 800 also includes an act 820 of training the font classification neural network to classify the fonts. In particular, the act 820 can involve training the font classification neural network to classify the plurality of fonts using the font training images and corresponding font classifications. In one or more embodiments, the dimensions of the font classification prediction vectors generated by the font classification neural network include m-dimensions based on a second number of font classifications corresponding to the font training images, where m-dimensions is different from n-dimensions. In some embodiments, the font classification neural network utilizes a softmax probability function to generate the font classification prediction vectors. In various embodiments, the font classification neural network includes a second convolutional neural network.

As shown in FIG. 8, the series of acts 800 further includes an act 830 of training an implicit font classification attention model to obtain an attention map that transforms font classification prediction vectors. In one or more embodiments, the act 830 includes training an implicit font classification attention model using font classification prediction vectors outputted from the trained font classification neural network to obtain a font classification attention map that transforms the font classification prediction vectors to match dimensions of font tag recognition feature vectors outputted from the trained font tag recognition neural network. In various embodiments, the implicit font classification attention model includes additional fully-connected layers and a sigmoid probability function added to the font classification neural network.

In many embodiments, the implicit font classification attention model utilizes a second sigmoid probability function to generate the font classification attention map. In various embodiments, the act 830 includes determining the font classification attention map for a first font of a first training image of the training font images. In additional embodiments, determining the font classification attention map for the first font includes generating a second training image including random characters of the first font, determining a second font classification attention map for the first font, averaging the first font classification attention map and the second font classification attention map for the first font, and utilizing the averaged font classification attention map for the first font to jointly train the font tag recognition neural network with the implicit font classification attention model.

As shown, the series of acts 800 also includes an act 840 of jointly training the font tag recognition neural network with the font classification attention map to determine enhanced tag-based font probabilities for each font. In particular, the act 840 can involve jointly training the font tag recognition neural network with the implicit font classification attention model using the font classification attention map and the font classification prediction vectors to determine enhanced tag-based font probabilities for each font of the plurality of fonts. In some embodiments, the act 840 includes comparing the font tags corresponding to the font training images as a ground-truth to the enhanced tag probabilities determined for the plurality of fonts to obtain an error loss amount and back propagating the error loss amount to the higher fully-connected neural network layers of the font tag recognition neural network.

In some embodiments, the act 840 includes jointly training the higher fully-connected neural network layers of the font tag recognition neural network with the implicit font classification attention model. In various embodiments, the act 840 also includes applying element-wise multiplication between the font classification attention map and the font classification prediction vectors to obtain weighted font classification feature vectors. In additional embodiments, the weighted font classification feature vectors are utilized to train the higher fully-connected neural network layers of the font tag recognition neural network. Additionally, in some embodiments, the font classification feature vectors and the weighted font classification feature vectors are hidden feature vectors.

The series of acts 800 can also include a number of additional acts. In one or more embodiments, the series of acts 800 includes the acts of receiving a font tag query including a font tag; determining, based on the enhanced tag-based font probabilities for each font of the plurality of fonts, one or more fonts having a highest tag-based font probability corresponding to the font tag in the font tag query; and providing the one or more fonts in response to the received font tag query.

As mentioned above, FIG. 9 illustrates a flowchart of a series of acts 900 for recommending fonts based on a font tag query in accordance with one or more embodiments. As shown, the series of acts 900 includes a first set of acts 910 of generating enhanced tag-based font probability vectors and a second set of acts 920 of recommending fonts. The first set of acts 910 can be performed offline or prior to the second set of acts 920, which are performed online or in response to receiving a font tag query.

As shown the first set of acts 910 comprises an act 930 of extracting font tag recognition feature vectors from the input font images. In particular, act 930 can involve extracting font tag recognition feature vectors from input font images using an encoder of a font tag recognition neural network. Each input font image can comprise characters in a font of a plurality of fonts. Act 930 can involve extracting font tag recognition feature vectors having a first dimensionality. For example, the font tag recognition feature vectors can comprise n-dimensions based on a first number of font tags used to train the font tag recognition neural network.

The first set of acts 910 comprises an act 932 of generating font classification prediction vectors. More specifically, act 932 involves generating font classification prediction vectors by processing the input font images using a font classification neural network. Act 932 involve generating font classification prediction vectors having a second dimensionality, which differs from the first dimensionality. For example, the font classification prediction vectors can comprise m-dimensions based on a number of font classifications used to train the font classification neural network. Act 932 can involve generating the font classification prediction vectors utilizing a SoftMax probability function.

The first set of acts 910 also comprises an act 934 of generating font classification attention maps. In particular, act 934 can involve generating font classification attention maps by transforming the font classification prediction vectors using an implicit font classification attention model. For example, act 934 can involve generating the font classification attention maps by transforming the font classification prediction vectors from the second dimensionality to the first dimensionality. In various embodiments, the act 934 includes generating a robust or averaged font classification attention maps by combining multiple font classification attention maps of the font generated from different character strings of the font.

The first set of acts 910 comprises an act 936 of generating font classification weighted feature vectors. In particular, act 936 involves generating font classification weighted feature vectors by combining the font tag recognition feature vectors and the font classification attention maps. For example, act 936 can involve applying element-wise multiplication between the font classification attention maps and the font tag recognition feature vectors.

The first set of acts 910 comprises an act 938 of determining enhanced tag-based font probability vectors. In particular, act 938 involves determining enhanced tag-based font probability vectors by processing the font classification weighted feature vectors utilizing the higher neural network layers of the font tag recognition neural network. For example, act 938 can involve generating the enhanced tag-based font probability vectors utilizing a sigmoid probability function. The first set of acts 910 can further involve generating a font tag database, based on the enhanced tag-based font probability vectors, that indicates the probability that each tag is associated with each font.

The second set of acts 920 includes an act 940 of receiving a font tag query. For example, act 940 can involve receiving one or more tags (e.g., words/phrases that a user desires in a font) entered by a user at a client device. Act 940 can optionally involve receiving the font tag query at a server over a network. Alternatively, act 940 can comprise receiving the font tag query at a client device.

The second set of acts 920 also involves an act 942 of determining one or more fonts having high probabilities of being associated with a font tag from the font tag query. In particular, act 942 involves determining one or more fonts having high probabilities of being associated with a font tag from the font tag query based on the enhanced tag-based font probability vectors. For example, act 942 can involve accessing a font tag database that was been generated prior to receiving the font tag query. The font tag database can be based on the enhanced tag-based font probability vectors and indicate the probability that each tag is associated with each font.

Finally, the second set of acts 920 can involve an act 944 of providing the one or more fonts as a recommended fonts. For example, act 944 can involve returning the one or more fonts as a response to the font tag query.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud computing system. A digital medium environment allows the font recognition system to train and employ multiple neural networks and/or machine-learning models, as described herein.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In addition, as used herein, the term "cloud computing environment" refers to an environment in which cloud computing is employed.

Figure 10:
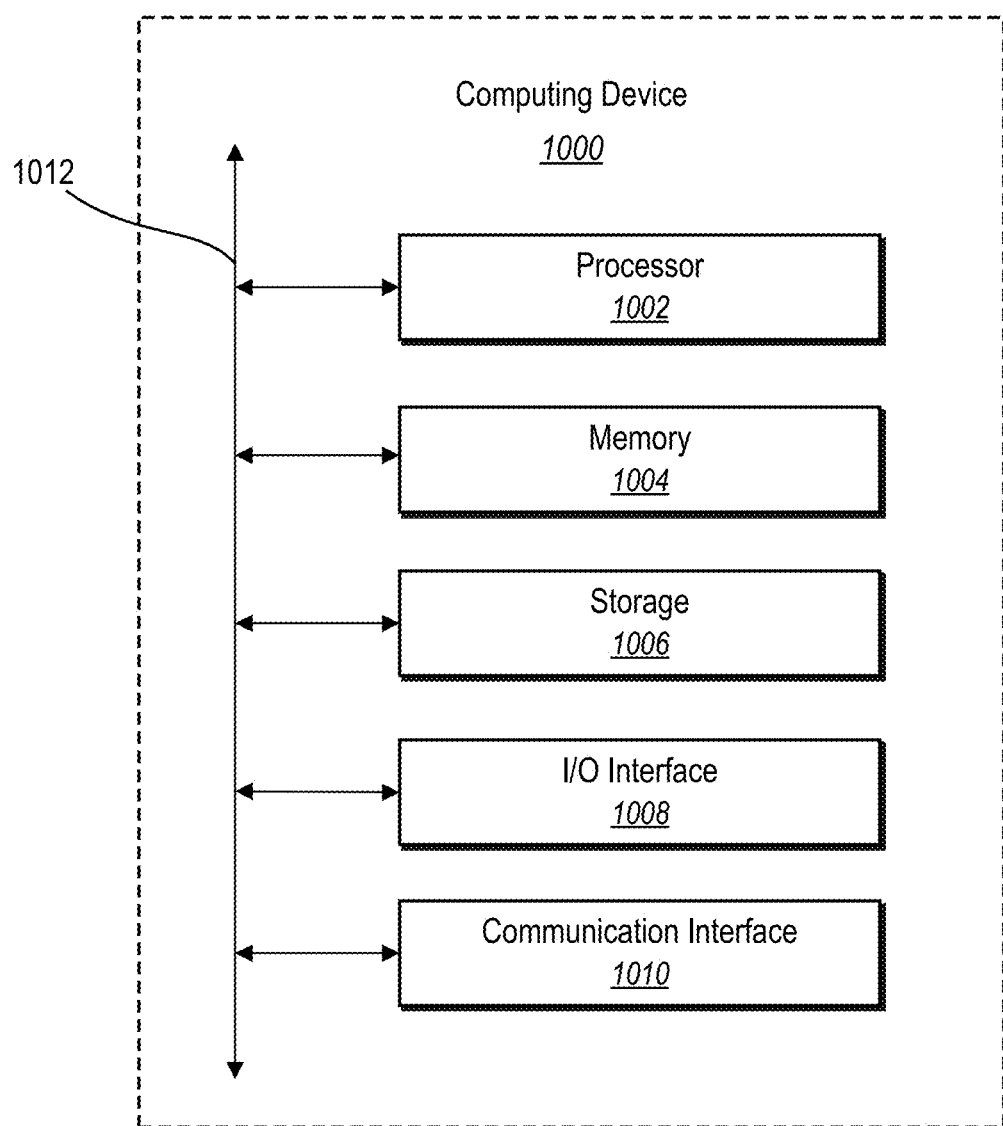
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., computing device 500, server device(s) 602, and client devices 604a-b). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output ("I/O") interfaces 1008, and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of the I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
    generate font tag recognition feature vectors from input font images utilizing a font tag recognition neural network;
    generate font classification prediction vectors by processing the input font images using a font classification neural network;
    generate font classification attention maps by transforming the font classification prediction vectors using an implicit font classification attention model;
    generate font classification weighted feature vectors by combining the font tag recognition feature vectors and the font classification attention maps; and
    determine enhanced tag-based font probability vectors based on the font classification attention maps utilizing a font tag recognition neural network.

2. The non-transitory computer-readable medium of claim 1, further comprising instructions that cause the computer system to:
    receive a font tag query;
    determine, based on the enhanced tag-based font probability vectors, one or more fonts having high probabilities of being associated with a font tag from the font tag query; and
    provide the one or more fonts as a recommended fonts in response to the font tag query.

3. The non-transitory computer-readable medium of claim 2, further comprising instructions that cause the computer system to:
    extract font tag recognition feature vectors from the input font images using an encoder of the font tag recognition neural network, each input font image comprising characters in a font of a plurality of fonts; and
    generate a font tag database, based on the enhanced tag-based font probability vectors, that indicates the probability that each tag is associated with each font.

4. The non-transitory computer-readable medium of claim 3, wherein the instructions, when executed by the at least one processor, cause the computer system to determine the one or more fonts having high probabilities of being associated with the font tag from the font tag query by accessing the font tag database, the font tag database having been generated prior to receiving the font tag query.

5. The non-transitory computer-readable medium of claim 1, wherein the instructions, when executed by the at least one processor, cause the computer system to:
    extract the font tag recognition feature vectors having a first dimensionality; and generate the font classification prediction vectors having a second dimensionality differing from the first dimensionality.

6. The non-transitory computer-readable medium of claim 5, wherein the instructions, when executed by the at least one processor, cause the computer system to generate the font classification attention maps by transforming the font classification prediction vectors from the second dimensionality to the first dimensionality.

7. The non-transitory computer-readable medium of claim 5, wherein:
   the first dimensionality of the font tag recognition feature vectors comprises n-dimensions based on a first number of font tags used to train the font tag recognition neural network; and
   the second dimensionality of the font classification feature vectors comprises m-dimensions based on a number of font classifications used to train the font classification neural network.

8. The non-transitory computer-readable medium of claim 1, wherein the instructions, when executed by the at least one processor, cause the computer system to:
   generate the enhanced tag-based font probability vectors utilizing a sigmoid probability function by processing the font classification weighted tag recognition feature vectors utilizing higher neural network layers of the font tag recognition neural network; and
   generate the font classification prediction vectors utilizing a SoftMax probability function.

9. A system for training a tag-based font recognition neural network comprising:
   a memory device comprising:
      font classification prediction vectors generated from input font images utilizing a font classification neural network;
      font tag recognition feature vectors generated from the input font images by a font tag recognition neural network; and
      an implicit font classification attention model;
   at least one computing device configured to cause the system to:
      generate font classification attention maps utilizing the implicit font classification attention model from the font classification prediction vectors;
      combine, within the font tag recognition neural network, the font classification attention maps and the font tag recognition feature vectors to generate weighted font classification feature vectors; and
      determine enhanced tag-based font probability vectors based on the weighted font classification feature vectors utilizing the font tag recognition neural network.

10. The system of claim 9, wherein the at least one computing device is further configured to cause the system to:
   receive a font tag query;
   determine, based on the enhanced tag-based font probability vectors, one or more fonts having high probabilities of being associated with a font tag from the font tag query; and
   provide the one or more fonts as a recommended fonts in response to the font tag query.

11. The system of claim 9, wherein the at least one computing device is further configured to cause the system to combine the font classification attention maps and the font tag recognition feature vectors within the font tag recognition neural network utilizing element-wise multiplication between the font classification attention maps and the font tag recognition feature vectors to generate font classification weighted feature vectors.

12. The system of claim 9, wherein the font tag recognition feature vectors and the weighted font classification feature vectors are hidden feature vectors within the font tag recognition neural network.

13. The system of claim 9, wherein the implicit font classification attention model is added as higher neural network layers to the font classification neural network.

14. The system of claim 9, wherein:
   the font tag recognition feature vectors comprise n-dimensions;
   the font classification prediction vectors comprise m-dimensions; and
   m-dimensions is different from n-dimensions.

15. The system of claim 14, wherein the at least one computing device is further configured to cause the system to generate the font classification attention maps by transforming the font classification prediction vectors from m-dimensions into n-dimensions utilizing the implicit font classification attention model.

16. In a digital medium environment for creating or editing electronic documents, a computer-implemented method of recognizing fonts based on font tags, comprising:
   generating font classification attention maps from input font images by utilizing an implicit font classification model after a font classification neural network;
   generating enhanced tag-based font probability vectors from the input images and the font classification attention maps utilizing a font tag recognition neural network;
   receiving a font tag query;
   determining, based on the enhanced tag-based font probability vectors, one or more fonts having high probabilities of being associated with a font tag from the font tag query; and
   providing the one or more fonts as a recommended fonts in response to the font tag query.

17. The computer-implemented method of claim 16, wherein the font tag query is a text query describing one or more attributes of a font.

18. The computer-implemented method of claim 16, further comprising:
   extracting font tag recognition feature vectors from the input font images using an encoder of the font tag recognition neural network, each input font image comprising characters in a font of a plurality of fonts; and
   generating a font tag database, based on the enhanced tag-based font probability vectors, that indicates the probability that each tag is associated with each font.

19. The computer-implemented method of claim 18, further comprising utilizing the font tag database to determine the one or more fonts having high probabilities of being associated with the font tag from the font tag query, wherein the font tag database is generated prior to receiving the font tag query.

20. The computer-implemented method of claim 16, further comprising:
   generating font classification prediction vectors by processing the input font images using the font classification neural network; and generating the font classification attention maps from input font images by utilizing the implicit font classification model that based on the font classification prediction vectors generated from the font classification neural network.

* * * * *